United States Patent [19]
Hirata et al.

[11] Patent Number: 5,192,557
[45] Date of Patent: Mar. 9, 1993

[54] CLAMPING APPARATUS FOR MOLDING MACHINE

[75] Inventors: Hisakazu Hirata; Kazuyuki Okubo; Motomi Kitamura, all of Nagano, Japan

[73] Assignee: Nissei Jushi Kogyo K.K., Nagano, Japan

[21] Appl. No.: 731,849

[22] Filed: Jul. 17, 1991

[30] Foreign Application Priority Data

| Jul. 27, 1990 | [JP] | Japan | 2-200593 |
| Aug. 31, 1990 | [JP] | Japan | 2-230273 |
| Aug. 31, 1990 | [JP] | Japan | 2-230274 |
| Aug. 31, 1990 | [JP] | Japan | 2-230275 |
| Aug. 31, 1990 | [JP] | Japan | 2-230276 |

[51] Int. Cl.$^5$ .............................. B29C 45/64
[52] U.S. Cl. .................. 425/589; 425/450.1; 425/451.9; 425/595
[58] Field of Search ........... 425/589, 590, 595, 450.1, 425/451.2, 451.9, DIG. 221

[56] References Cited

U.S. PATENT DOCUMENTS

| 2,976,569 | 3/1961 | Quere et al. | 425/451.2 |
| 3,801,256 | 4/1974 | Farrell | 425/450.1 |
| 4,504,208 | 3/1985 | Kurumaji et al. | 425/595 |
| 4,747,982 | 5/1988 | Nakatsukasa et al. | 425/451.9 |
| 4,865,537 | 9/1989 | Shima | 425/590 |
| 4,874,309 | 10/1989 | Kushibe et al. | 425/589 |
| 4,948,358 | 8/1990 | Kushibe et al. | 425/574 |
| 4,984,980 | 1/1991 | Ueno | 425/595 |
| 5,017,120 | 5/1991 | Holzinger et al. | 425/451.9 |

FOREIGN PATENT DOCUMENTS

| 0296410 | 12/1988 | European Pat. Off. |
| 63-317243 | 12/1988 | Japan |
| 64-2773 | 1/1989 | Japan |
| 64-69320 | 3/1989 | Japan |
| 64-87219 | 3/1989 | Japan |
| 129063 | 9/1989 | Japan |
| 2-178015 | 7/1990 | Japan |
| 1163877 | 9/1969 | United Kingdom |

*Primary Examiner*—Jay H. Woo
*Assistant Examiner*—James P. Mackey
*Attorney, Agent, or Firm*—Sughrue, Mion, Zinn Macpeak & Seas

[57] ABSTRACT

A clamping apparatus of molding machine including a base; a fixed board disposed on the base; a movable board movable relative to the fixed board; a plurality of mold clamping cylinders disposed in predetermined positions of the fixed board, the mold clamping cylinders each having a mold clamping piston with a tie bar reception hole and a tie bar connection device disposed on the mold clamping piston; a plurality of tie bars with a thread at their one end, the tie bars being disposed in correspondence with the mold clamping cylinders on the movable board; a plurality of mold opening/closing cylinders for moving the movable board; and a mold thickness adjustment device having a movable stopper for contacting an end of each tie bar to control the axial position of each of the tie bars with respect to the connection devices during clamping.

5 Claims, 16 Drawing Sheets

CLAMPING APPARATUS FOR MOLDING MACHINE

BACKGROUND OF THE INVENTION

The present invention relates to a clamping apparatus for a molding machine such as an injection molding machine, a die cast machine, and a press molding machine.

A clamping apparatus for clamping a mold whose halves are disposed on a fixed board and a moving board in the following construction is disclosed in Japanese Patent Application Laid-open Document No. SHO 63-317243.

In the clamping apparatus, mold clamping cylinder devices have tie bar insertion holes at four corners of the fixed board disposed on a base. Tie bars each having a thread shaft are disposed at the four corners of the movable board disposed on the base. Half nut connection devices disposed at an outer portion of the fixed board are connected to mold clamping pistons of mold clamping cylinders. As the movable board is moved, the tie bars are inserted into the mold clamping cylinders. Thereafter, the tie bars are connected to the mold clamping pistons by the half nuts.

In the above mentioned clamping apparatus, the connection is made with a thread engagement. Thus, the engagement position is determined in accordance with the thickness of molds to be used and both thread pitches should be matched.

Consequently, unless both the mold halves have been completely closed, the connection cannot be made with the thread engagement. Thus, since a time for which the clamping pressure rises becomes long, the molding cycle tends to have a loss.

Also, since the above-mentioned clamping apparatus outputs a large mold clamping force, mold clamping cylinders with a large diameter are used. Thus, a large amount of hydraulic oil is used, it is of course smaller than that of a direct pressure type clamping apparatus. Conventionally, in one oil chamber, hydraulic oil is supplied, while in other oil chamber, hydraulic oil is drained to the hydraulic circuit. In other words, when the oil chambers on both sides of each mold clamping piston are independently controlled, a pressure rise with a high speed characteristic cannot be accomplished. To accomplish it, a pump with a large delivery amount, a hydraulic pipe with a large diameter allowing a large capacity of hydraulic oil to pass instantaneously, and a valve with a large capacity are required.

Nevertheless, the pump with a large delivery amount has substantially a low response characteristic. To prevent that, it is possible to operate a plurality of pumps with a small capacity in parallel. However, when such a system is used, its construction will become complicated and large and thereby increasing the production cost.

Also, in such an apparatus, the parallelism of the mold mounting surfaces of the fixed board and the movable board should be kept by a particular means unlike another clamping apparatus where a plurality of tie bars disposed on a pair of fixed boards on a machine base are inserted into a movable board, the movable board being movable back and forth relative to the fixed board with a guide of the tie bars. The value of adjustment with respect to the parallelism is very small. In the above-mentioned apparatus according to the prior art, a support which extends in the moving direction is disposed on the left and right sides of the legs of the movable mold plate. On the lower side of the support, a guide mounting plate and a guide block are disposed. The movable mold plate is mounted on the guide rails. The guide mounting plate and the support are slightly rotated so as to relatively offset their positions. In this state, the guide plate and the support are connected at four positions of front, rear, left, and right positions by pins.

In the construction according to the prior art, the stopper bolt is screwed from the inner surface of the support to the guide mounting plate. The stopper bolt whose thread end contacts the guide mounting plate causes the guide mounting plate to relatively deviate from the support so as to adjust the parallelism of the movable mode plate against the fixed mold plate. Thus, the connections of the guide mounting plate and the support are limited only to the above-mentioned four positions which are front, rear, left, and right positions. In addition, the connected portions only withstand the relative deviation. Thus, when the mold halves are frequently clamped, the stopper bolt are loosened and the position of the guide mounting plate deviates, thereby losing the parallelism.

In the conventional clamping apparatus, a movable board is approached to a fixed board and thereby mold clamping pistons of mold clamping cylinders disposed on the fixed board side and tie bars with a thread shaft disposed on the movable board side are closed. Thereafter, a half-nut connected to each mold clamping piston is engaged with the thread shaft of each tie bar to thereby clamp mold halves.

In the clamping apparatus according to the prior art, it is said that the half-nuts and the thread of each tie bar can be matched by moving the half-nuts for a small amount in the longitudinal direction. However, although the half-nuts slidably supported through a bracket are contacted with the end portion of a ram by a spring, the practical construction of the fine adjustment of the engagement positions of the half-nuts and the thread of each tie bar is not shown. Moreover, in the prior art, when the fixed mold half and the movable mold half are engaged and the end portion of each tie bar passes through and stops at the fixed board, the tie bar is connected to the half-nuts. Thus, the mold closing speed cannot be slowed down with each mold clamping cylinder and thereby the mold halves cannot be properly protected.

In the conventional clamping device for an injection molding machine is equipped with a safety door in a side position thereof for safety of the operator. While the safety door is kept open, the mold closing operation is electrically prohibited. In addition, by considering the worst case, unless the safety door is closed, the mold halves cannot be mechanically closed as a dual safety countermeasure. In a conventional clamping device where a movable board is movably disposed between a pair of fixed boards on a machine base and mold halves are closed by the movable board with a guide of tie bars, a safety rod extends from the movable board to the fixed board which is provided with the mold half. A stopper member for supporting the end portion of the safety rod is vertically movably disposed on the fixed board side. The movable member of the stopper member is disposed at the upper end portion of the safety door. When the safety door is closed, the movable member upwardly pushes the stopper member. Thus, only when the components located at the end portion of the safety rod are removed, the mold halves can be closed. However, in a large clamping device where a pair of a fixed board and a movable board are disposed on the machine base and the movable board is movable back and forth relative to the fixed board with a pair of guide rails disposed on an upper surface of the machine base, no tie bars which are used to support the load of the movable board and to function as guides are used. Thus, when the safety rod which extruding toward the fixed board is mounted on the movable board, the load of the safety rod is applied to the movable board as a localized load. As a result, it is difficult to maintain the parallelism of the movable board relative to the fixed board.

In addition, whenever the mold halves are replaced, the length of the extrusion should be adjusted in accordance with the thickness thereof. Since the safety rod is fixed by nuts, the length of extrusion is adjusted by loosening them. In a small clamping device, such a manual adjustment operation can readily be performed by one person. Nevertheless, when the device becomes large, since the safety rod is heavy, it is difficult to adjust it only by one person.

Also, according to the automatic replacement of mold haves, with respect to labor saving, automatic position adjustment of the safety rod is desired.

SUMMARY OF THE INVENTION

An object of the present invention is to solve a variety of problems and to provide a clamping apparatus for a molding machine for performing connection with thread engagement before mold halves have not been closed.

Another object of the present invention is to solve such an engineering problem and to provide a clamping apparatus for a molding machine having a pressure rise with a high speed characteristic in a simple and small capacity hydraulic system.

An object of the present invention is to provide a clamping apparatus for a molding machine where the connections of the sliders composed of the upper plate on the movable board side and the lower plate on the guide rail side are strong and where frequent movement of the movable board for closing and opening the mold halves will not lose the parallelism thereof.

An object of the present invention is to provide a clamping apparatus for a molding machine for easily adjusting the engagement position of each tie bar and each half-nut whenever replacing the mold halves and for slowing down the mold close speed with each mold clamping cylinder in the manner that each mold clamping piston receives each tie bar.

Another object of the present invention is to provide a safety apparatus for a clamping apparatus for preventing the safety rod from receiving a local load, for readily aligning the safety rod and the stopper member in the state where the safety rod has a large diameter and a large weight on a large scale of the molding machine, and for automatically adjusting the position of the safety rod when replacing the mold halves.

According to one aspect of the invention, there is provided a clamping apparatus for a molding machine, comprising: a fixed board disposed on a base; a movable board disposed on said base, said movable board being movable relative to said fixed board; a plurality of mold clamping cylinder devices each having a tie bar insertion hole, said plurality of mold clamping cylinder devices being provided in predetermined positions of one of said fixed board and said movable board; a half nut connection device, disposed at an outer position of one of said fixed board and said movable board, for connecting one of said movable board and said fixed board, having tie bars with thread shafts at their ends, said one of said movable board and said fixed board being connected to clamping pistons of said mold clamping cylinders; a mold opening/closing cylinder device for moving said movable board relative to said fixed board; and a mold thickness adjustment device disposed at an outer position of said connection device, said mold thickness adjustment device having a stopper for contacting with an end of the tie bar, said stopper being movable in the axial direction thereof.

In the above mentioned construction, when the end of each tie bar is passed through each mold clamping piston and contacted with the stopper, the tie bar, the connection device, and the mold clamping piston are moved as a one-piece in the axial direction. Since they are moved together with the tie bar, in a low speed movement state before the mold halves are closed, the half nuts and the thread shaft are engaged and the pressure of the mold clamping cylinder device can be immediately raised. Thus, in comparison with the prior art where the mold halves are closed and engaged and then the pressure of the mold clamping cylinder is raised, according to the present invention, the clamping process can be rapidly performed.

According to another aspect of the invention, there is provided a clamping apparatus of molding machine comprising: a base; a fixed board disposed on said base; a movable board movable relative to said fixed board; a plurality of mold clamping cylinders disposed in predetermined positions of said fixed board, said mold clamping cylinders each having a mold clamping piston with a tie bar reception hole and a tie bar connection device disposed on said mold clamping piston; a plurality of tie bars with a thread at their one end, said tie bars being disposed in correspondence with said mold clamping cylinders on said movable board; a plurality of mold opening/closing cylinders for moving said movable board; and a differential circuit connected between a front oil chamber and a rear oil chamber of each of said plurality of mold clamping cylinder.

The plurality of mold clamping cylinders are disposed on said movable board, said plurality of tie bars being disposed on said fixed board.

In the above-mentioned construction, each mold clamping piston is connected to each tie bar through each connection device. Thereafter, the rear oil chamber is pressurized with the mold clamping piston. Thus, the hydraulic oil is moved to the front oil chamber through the differential circuit. The remaining hydraulic oil which corresponds to the difference of the pressure affecting area is drained. The mold closing speed by the mold opening/closing cylinder is slowed down. When the front oil chamber is pressurized by hydraulic oil, since the differential circuit is closed, the hydraulic oil in the rear oil chamber is drained and a high pressure mold clamping force takes place. When the hydraulic oil is supplied to both the oil chambers, due to the difference of pressure affecting area, a mold opening force takes place.

The apparatus may further comprise sliders disposed between said movable board and said guide rails, said sliders being composed of an upper plate on said movable board side and a lower plate on said guide rail side, said upper and lower plates being slidably layered, said upper and lower plates being connected to each other by at least four detachable bolts, one of said sliders having a pin around which said both upper plates rotate.

In the above-mentioned construction, when the upper plate and the lower plate of the slide are unbolted, both the plates are mutually slidable. When both the lower plates of the sliders are fixed and the upper plate of the slider without the pin is pressed in the forward or backward direction, both the upper plates are rotated about the pin along with the movable board. Thus, the orientation of the movable board against the fixed board varies and thereby the parallelism of the movable board can be adjusted only by sliding the upper plate. After the parallelism is adjusted, since the upper plate and the lower plate is securely bolted, even if the movable board is frequently moved for opening and closing the mold halves, they does not deviate.

According to still another aspect of the invention, there is provided a clamping apparatus of molding machine, comprising: a movable board movable relative to a fixed board disposed on a base; a plurality of mold clamping cylinders disposed in predetermined positions on said fixed board; a plurality of tie bars, disposed in accordance with said mold clamping cylinders on said movable board, and having a thread shaft at one end thereof; a mold opening/closing cylinder for moving said movable board relative to said fixed board; a mold clamping piston disposed in said mold clamping cylinder and having a reception hole of said tie bar; a mold thickness adjustment device having a stopper of said tie bar movably screwed in a thread pipe disposed at the rear end of said mold clamping piston and a motor for moving said stopper in an axial direction; a pair of tie bar connection devices faced with a chuck connected to said thread shaft through said reception hole and disposed on said mold clamping pistons; a sleeve, disposed in the opening on the fixed board side of said mold clamping cylinder, for connecting an engagement adjustment screw ring in the manner that the inner end faces outward and for functioning as a tie bar reception hole movable to said mold clamping piston in the axial direction; and a reception wall at the end of said sleeve, formed in said reception hole.

The mold thickness adjustment apparatus may comprise: a thread pipe extendedly disposed at the rear end of said mold clamping piston, the outer end of said thread pipe being closed; a tie bar stopper for engaging said thread pipe with a thread in the inner wall thereof and for engaging with a spline shaft disposed at the outer end of said thread pipe, said tie bar stopper being movable relative to said reception hole; a servo motor, disposed at the outer end of said thread pipe, for rotating said spline shaft; and a stopper adjustment bolt.

In the above-mentioned construction, when the sleeve is inserted, its end is contacted with the reception wall, thereby moving the mold clamping piston along the thread shaft. Thus, since the chuck is also moved to the thread surface of the thread shaft, the engagement position of the thread shaft can be matched with that of the chuck with the sleeve. In addition, when the movable board is forwardly moved to the fixed board, the thread shaft at the end of the tie bar is inserted into the mold clamping piston. Before the mold halves are completely closed, the end surface contacts the stopper in the thread pipe. Thus, the tie bar is held by the mold clamping piston through the stopper. Since the tie bar is moved together with the mold clamping piston, the mold closing speed slows down. While the mold closing slows down, since the thread shaft stops against the chuck, the tie bar is connected to the mold clamping piston until the mold halves are completely closed.

A safety apparatus for a clamping apparatus, wherein a fixed board and a movable board are opposed on a machine base, said movable board being movable relative to said fixed board with a pair of guide rails disposed on said machine base, a safety door being disposed at a side portion of said safety apparatus, comprising: an engagement device, disposed on the lower side of said movable board, for vertically moving a stopper member when said safety door is opened or closed; a safety rod being disposed between said fixed board and a bearing portion on said machine base located behind said movable board, said safety rod passing through said stopper member and having a particular number of engagement stages disposed at predetermined intervals; and a thread shaft formed at the rear end of said safety rod being connected by a nut of said bearing portion, said thread shaft being movable in the axial direction.

The safety apparatus may further comprise: a nut shaped rotation member disposed at said bearing portion on said machine base and rotated by a drive device; a thread shaft formed at the rear end of said safety rod and connected to said moving member; a pair of switches, disposed on an engagement device, for checking lift-up and lift-down of said stopper member; and a pair of switches, disposed at the rear end on the thread shaft side of said safety rod, for limiting the movement of said safety rod; whereby said both pairs of switches allow the engagement position by said drive device to be automatically adjusted.

In the above-mentioned construction, when the safety door is closed, the air cylinder works. Thereby, the stopper member is raised and the engagement with the safety rod is released. On the other hand, when the safety rod is opened, air is discharged. Thus, the stopper member is lowered and the part of the stopper member is placed at the engagement stage portion and thereby preventing the safety rod from moving forwardly along with the movable board. Consequently, since the movable board is not moved, the mold halves are not closed. Moreover, in the case of the automatic adjustment, while the safety door is open, unless the proximity switch does not detect that the stopper member is lowered, the motor is automatically turned on.

Thus, the rotation member is rotated and thereby the safety rod is moved in one of the forward and backward directions in the predetermined range of the proximity switch for limiting the movement with the thread lead. When the position of the engagement stage portion deviates and thereby the stopper member is placed in the ring shaped groove of the safety rod, the proximity switch detects that the stopper member is lowered. Thereafter, the drive device is immediately stopped and then the adjustment of the engagement position is completed.

According to still another aspect of the invention, there is provided a safety apparatus for a clamping device, wherein a movable board is disposed between a pair of fixed boards on a machine base, said movable board being movable back and forth, a safety door being disposed on a side of said machine base, comprising: an engagement device, disposed on said movable board, for vertically moving a stopper member when said safety door is opened or closed; and a safety rod horizontally disposed between said fixed boards, said safety rod being axially movable, said safety rod passing through said stopper member, said safety rod having a predetermined number of engagement stage portions at predetermined intervals at the periphery thereof, a thread shaft formed at the rear end of said rod being connected with a rotation member, said rotation member being disposed in a constant position of one of said fixed boards, a drive device of said rotation member being mounted on the fixed board.

The safety apparatus may further comprise: a pair of switches, disposed of said engagement device, for checking that said stopper member is raised or lowered; and a pair of switches, disposed at the rear end of said thread shaft of said safety rod, for limiting the movement of said safety rod.

BRIEF DESCRIPTION OF THE DRAWINGS

In the accompanying drawings:

FIG. 6 is a schematic describing a chucking state, FIG. 7 is a schematic describing a high pressure mold clamping state, FIG. 8 is a schematic describing a mold strong mold opening state;

DESCRIPTION OF THE PREFERRED EMBODIMENTS

Figure 1:
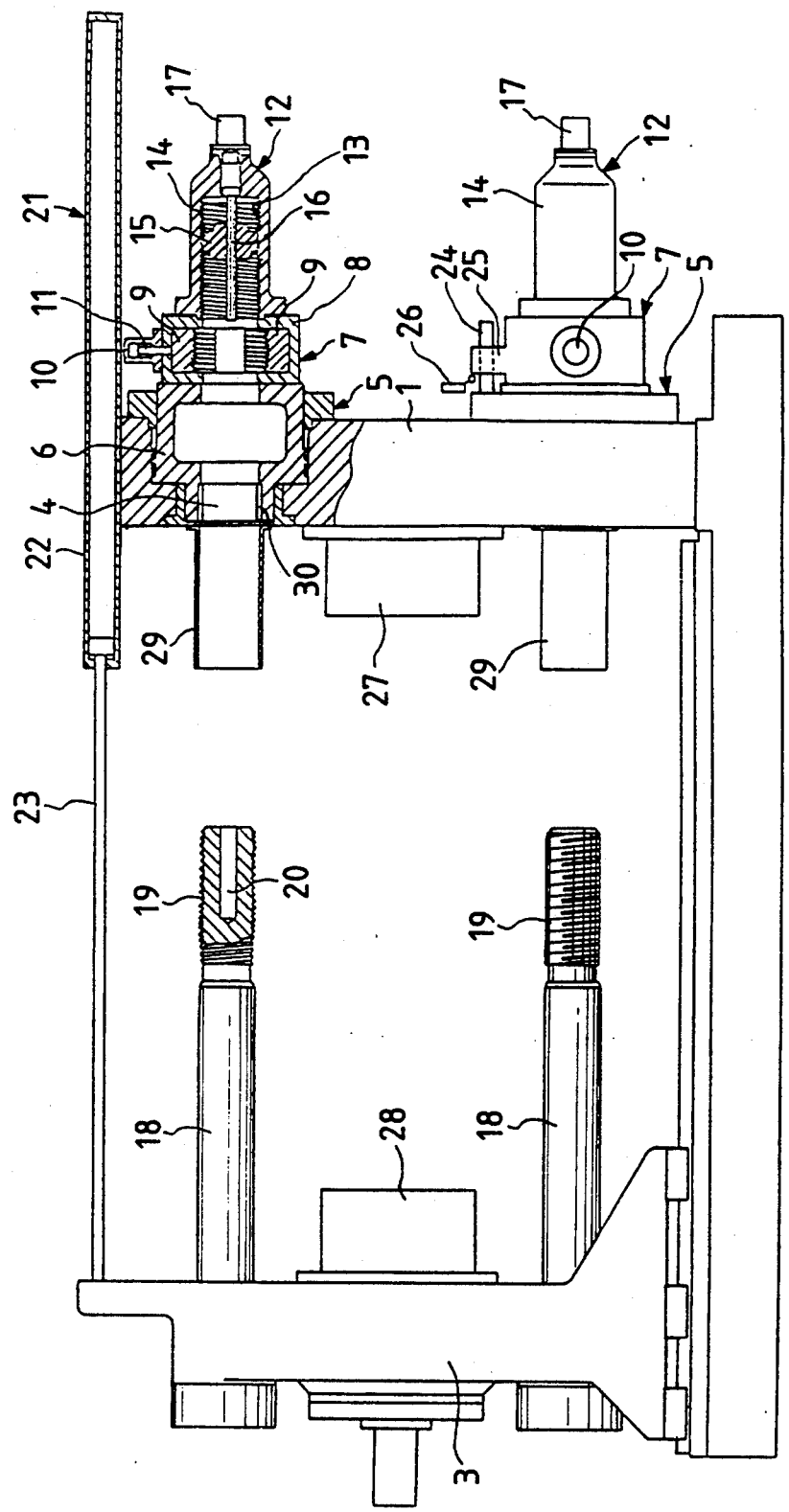
FIG. 1 is a vertical sectional view of a clamping apparatus, according to one embodiment of the invention, showing the state where mold halves are open.

The present invention will now be described with reference to the accompanying drawings.

A first embodiment of the invention will be explained with reference to FIGS. 1 to 4 in which a fixed board 1 is disposed on one side of a base 2, and a movable board 3 is disposed on the base 2 movably toward the fixed board 1. Mold clamping cylinder devices 5 each having a tie bar insertion hole 4 are disposed at four corners of the fixed board 1. The tie bar insertion hole 4 is formed into an insertion hole, for a mold clamping piston 6, both ends of which are opened. The outer end of the mold clamping piston 6 is connected to a connection device 7.

The connection device 7 has a cover 8 opened at both ends and contacted with an outer end surface of the mold clamping piston 6. In the cover 8, a pair of half-nuts 9 with a thread on the inner surface are opposed movably in the radial direction. The half-nuts 9 are mounted on a piston rod 11 of a cylinder 10 disposed on the cover 8.

Reference numeral 12 denotes a mold thickness adjustment device. The mold thickness adjustment device 12 is composed of a cylindrical casing 14 whose outer end is closed and which has a thread 13 on the inner surface; a nut shaped stopper 15 which is disposed in the casing 14 and engaged with the thread 13; a spline shaft 16 inserted into a center portion of the stopper 15; and a servo motor 17 which is disposed at the outer end of the casing 14 for rotating the spline shaft 16. The open inner end of the mold thickness adjustment device 12 is fixed to the outer end surface of the cover 8 of the connection device 7. In other words, the mold thickness adjustment device 12 is joined with the connection device 7. Thus, the mold thickness adjustment device 12 is moved together with the connection device 7 by the mold clamping piston 6. A tie bar 18 is disposed horizontally corresponding to the tie bar insertion hole 4 at each of four corners of the movable board 3. The end portion of each tie bar 18 is formed into a thread shaft 19 connected to the threads of the half-nuts 9. An insertion hole 20 for inserting the spline shaft 16 is provided in the center of the thread shaft 19.

In a mold opening/closing cylinder device 21, a cylinder 22 is fixed to the upper portion of the fixed board 1 and a piston 23 is fixed to the upper portion of the movable board 3.

A pin 24 for preventing the mold clamping piston 6 from rotating extends from the mold clamping cylinder device 5 to a projection 25 of the side portion of the cover 8 of the connection device 7. A limit switch 26 for detecting a rear limit position of the mold clamping cylinder 6 is disposed on the inner side of the projection 25. Reference numeral 27 denotes a fixed mold half, numeral 28 denotes a movable mold half. A guide cylinder 29 for the tie bar 18 is disposed on the fixed board side. A tie bar guide 30 is disposed in the opening of the mold clamping piston 6.

The operation of the clamping apparatus of the molding machine according to the present invention will now be described. In the mold open state shown in FIG. 1, the mold opening/closing cylinder device 21 causes the movable board 3 to move forwardly to the fixed board 1 so as to close the mold halves. As the movable board 3 is moved forwardly, the tie bars 18 are inserted into the tie bar insertion holes 4 of the mold clamping cylinder devices 5 whereby the thread shafts 19 at the end of the tie bars 18 are inserted into the casing of the mold thickness adjustment devices 12.

When the mold halves are completely closed, each servo motor 17 causes the spline shaft 16 to rotate, thereby moving the stopper 15 which has been placed on the closing side of the casing 14 to the tie bar side by the thread lead. Thus, the stopper 15 contacts with the end face of the thread shaft 19.

Thereafter, the operation of the servo motor 17 is stopped, so that the stopper 15 is kept in contact with the thread shaft 19. This position where the stopper 15 is placed is referred to as a mold closing reference position of both the mold halves 27 and 28 mounted on the fixed board 1 and the movable board 3, respectively. In mold closing reference position, the engagement position of the half-nuts 9 and the thread shaft 19 is set by using the stopper 15.

The stopper 15 is moved forwardly by the servo motor 17 so that the mold halves are opened by the amount which is necessary for the high pressure mold clamping or high pressure mold unclamping. If the engagement could not be attained in the set position due to a small deviation or offset of the threads, the mold clamping piston 6 is moved so as to compensate for the deviation. At that time, the compensation position is used as the operation start point of the mold clamping piston 6.

Figure 2:
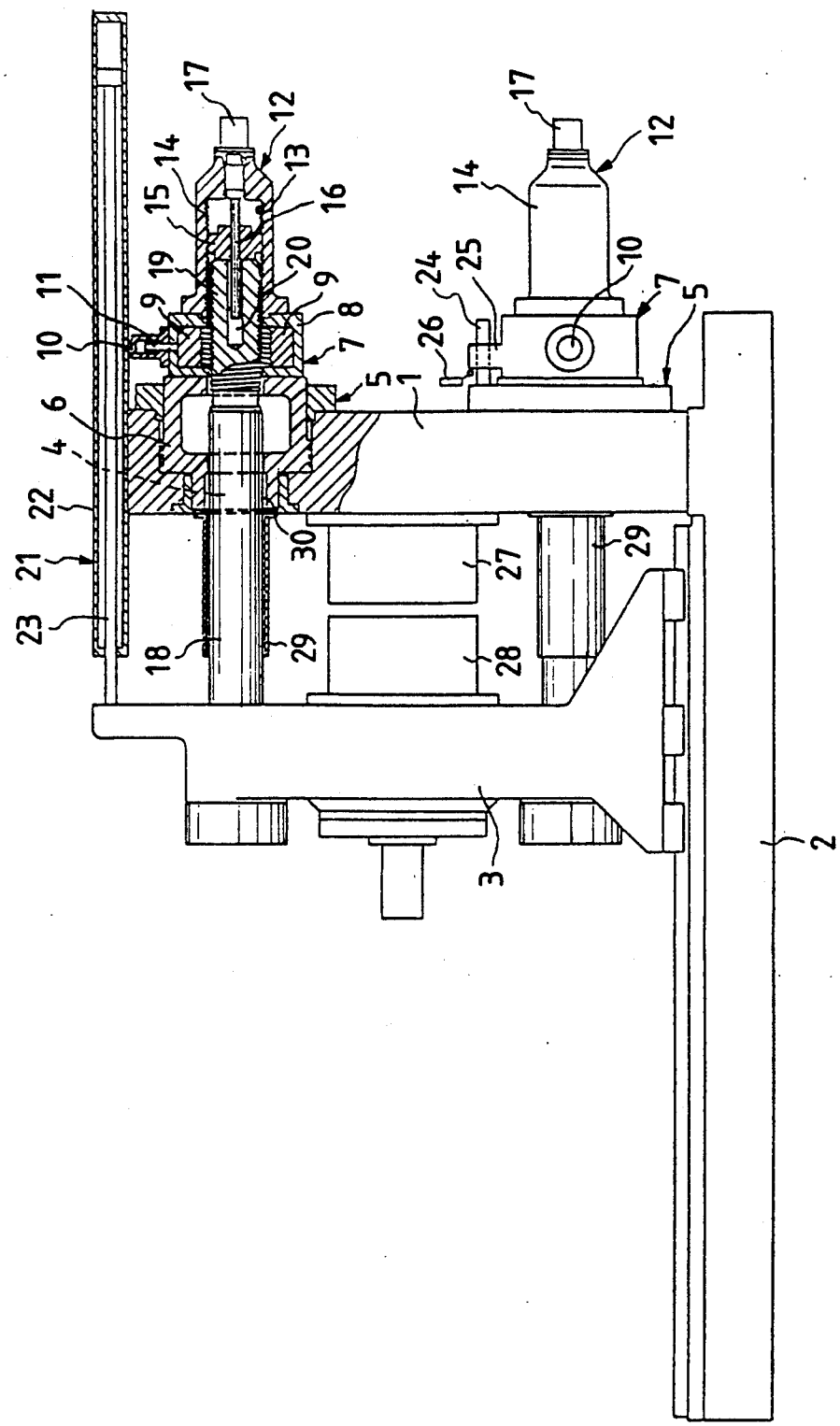
FIG. 2 is a vertical sectional view of the clamping apparatus showing the state where mold halves are closed.

After the engagement position has been set in accordance with the thickness of the mold halves, the mold opening/closing cylinder device 21 is operated and then the movable board 3 is moved forwardly so as to close the mold halves. The mold closing speed is slowed down at a predetermined position. In addition, as shown in FIG. 2, after the tie bar 18 has been inserted into the tie bar insertion hole 4, the end face of the tie bar 18 contacts with the stopper 15 before the mold halves are completely closed.

Even after the end face of the tie bar 18 contacted with the stopper 15, since the tie bar 18 is moved together with the movable board 3, the connection device 7 and the mold clamping piston 6 which are made in unison with the casing 14 along with the common centerline are moved together with the tie bar 18 to the mold closing completion position.

Figure 3:
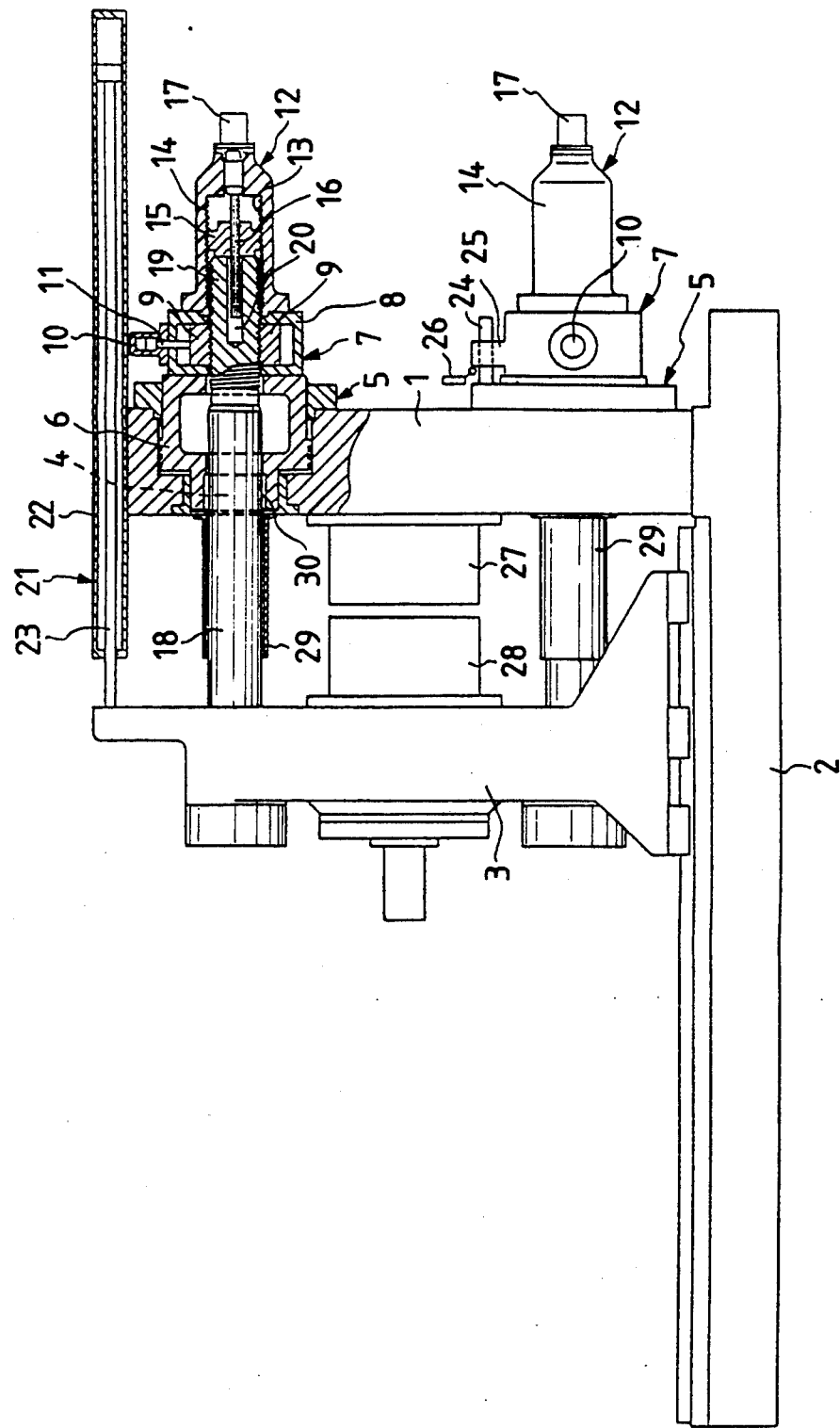
FIG. 3 is a vertical sectional view of the clamping apparatus showing the state where mold halves are connected.

In addition, since the engagement position of the end face of the tie bar 18 and the stopper 15 has been predetermined as the engagement position, after they have been brought into contact with each other, the position is kept unchanged. Thereafter, even if the cylinder 10 is operated, the thread shaft 19 and the half-nuts 9 are securely engaged in unison with each other as shown in FIG. 3.

When the engagement of the thread shaft 19 and the half-nuts 9 is detected by a limit switch or the like and then hydraulic oil is supplied to the mold clamping cylinder device 5, the pressure of the mold clamping cylinder 5 is increased for the high pressure mold clamp operation.

Figure 4:
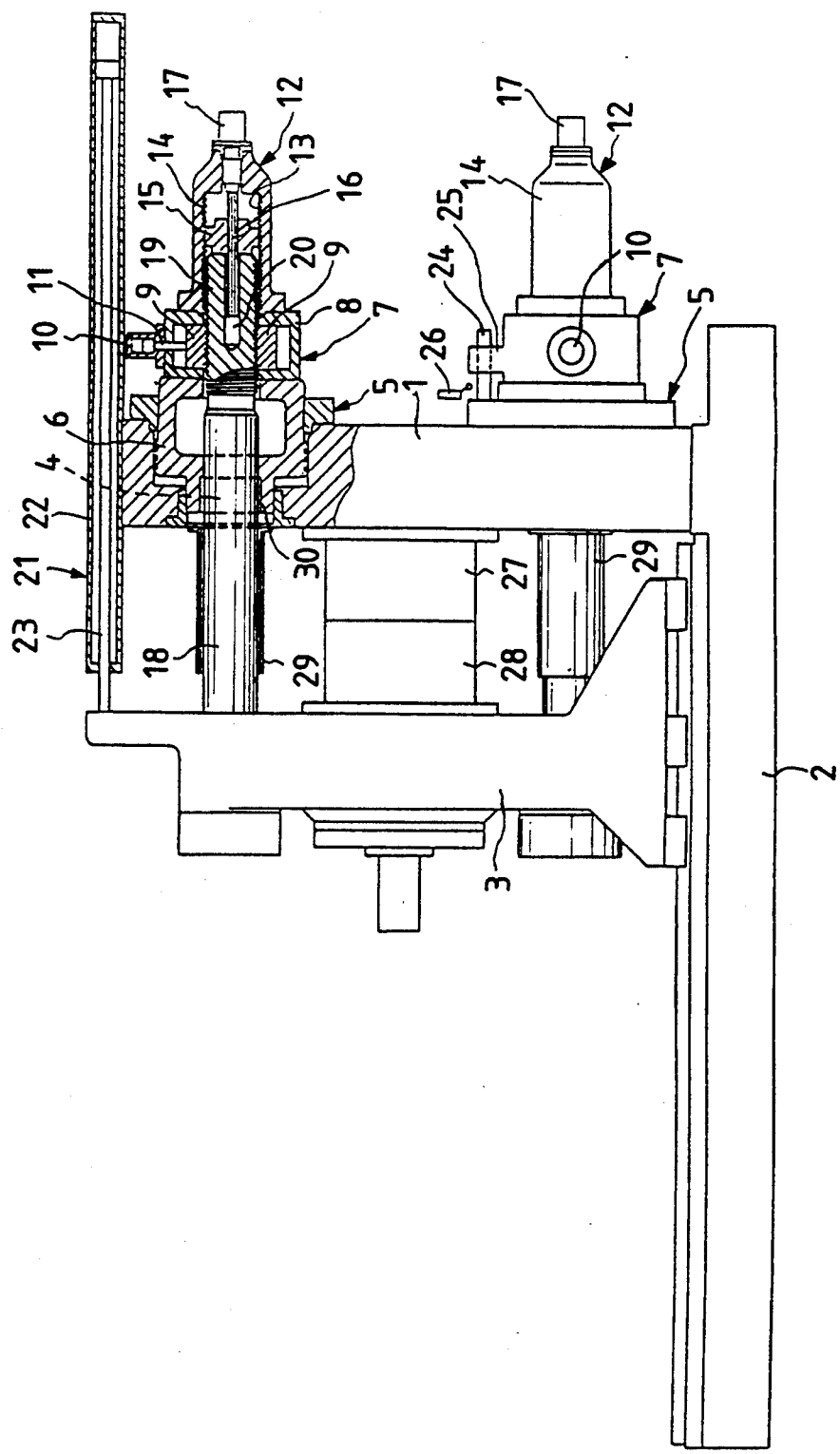
FIG. 4 is a vertical sectional view of the clamping apparatus showing the state where mold halves are clamped.

Thus, when the mold halves have been closed as shown in FIG. 4, the mold clamp process has already taken place and thereby molten resin can be injected to the mold halves.

Subsequently in order to open the mold halves, the pressure of the molding cylinder device 5 is released. Thus, the pressure applied to the connection surface of the half-nuts 9 and the thread shaft 19 by the clamping pressure is released and then the cylinder 10 is operated to disengage the half-nuts 9 from the thread shaft 19.

In the state of the disengagement of the half-nuts 9 and the thread shaft 19, the tie bar 18 is in contact with the stopper 15. Thus, the hydraulic pressure for the clamping cylinder device 5 is switched over so that the mold clamping piston 6 is moved back to the original position with the high pressure, the tie bar 18 is returned back through the stopper 15 and thereby the mold halves are opened at a high pressure.

In the above-mentioned embodiment, the thread and the spline were used as the moving means of the stopper 15. However, the device for driving the stopper may be a hydraulic motor. In addition, to synchronize the respective portions, a transmission means such as a chain may be used.

Moreover, in the above-mentioned embodiment, the mold clamping cylinder devices are disposed on the fixed board side and the tie bars on the movable board side. It is however apparent for those skilled in the art that the mold clamping cylinder devices may be disposed on the movable board side and the tie bars on the fixed board side so as to accomplish the same effect as that of the above-mentioned embodiment.

As was described above, the mold clamping pistons of the mold clamping cylinder devices having the tie bar reception holes, the connection devices having the half-nuts, and the mold thickness adjustment devices having the stopper in contact with the tie bars and movable in the axial direction are unified in particular positions of the fixed board or the movable board. By contacting each stopper to the end face of each tie bar, the half-nuts is engaged with the thread shaft disposed at the end of the tie bar in the position according to the thickness of the mold halves. Thus, the tie bars can be connected to the mold clamping cylinders through the half-nuts when the mold halves are closed at a low speed. Thereby, when the mold halves have been closed, the high pressure process can be performed.

Consequently, the clamping time according to the present invention is shorter than that according to the prior art and thereby reducing the mold cycle time.

FIGS. 5 to 8 show another embodiment of the invention, in which a fixed board 101 is disposed on one side of a base 102, and a movable board 103 is disposed on the base 102 and is movable to the fixed board 101. Numeral 104 denotes a mold opening/closing cylinder. A cylinder 104a is fixedly mounted on the fixed board side. A rod 104b is fixedly mounted on the movable board side. Mold clamping cylinders 105 are integrally disposed on the outside at four corners of the fixed board 1. In the fixed board 101 on which each mold clamping cylinder 105 is disposed, a sleeve 107 having a tie bar insertion hole connected to a thread ring 106 for adjusting the engagement position is inserted into the mold clamping cylinder 105. The sleeve 107 is disposed at the outer periphery of the tie bar insertion hole and at the inner end of the fixed board 101. The sleeve 107 is movable in the axial direction by a guide member (not shown).

The mold clamping cylinder 105 is provided with a cylinder 108 integrally formed with the fixed board 101, a mold clamping piston 111 with a through hole 110 in which a tie bar 109 on the movable board side is inserted in the axial direction along with the sleeve 107, a mold thickness adjustment device 112 disposed at the rear end of the mold clamping piston, and a connection device 113 for connecting the tie bar 109, the connection device 107 being disposed on the side of the mold clamping piston 111.

The clamp thickness adjustment device 112 is composed of a thread pipe 114 whose outer end is closed and which is disposed at the rear end of the mold clamping piston 111, a stopper 116 engaged with a thread on the inside of the thread pipe 114 and engaged with a spline shaft 115 extending from the outer end of the thread pipe, a servo motor 117 for rotating the spline shaft 115, and an adjustment bolt 118 disposed at the outer end.

The connection device 113 is composed of a cylinder 119 disposed on both sides of the mold clamping piston 111 and a half-nut shaped chuck 122, which is connected to the end of a piston rod 120, which is housed in an annular concave portion 121 of the reception hole 110 of the tie bar 109, and which is faced with the reception hole 110. The cylinder 119 is moved together with the mold clamping piston 111 through an oblong hole 123 disposed on the cylinder 108 of the mold clamping cylinder side.

The tie bar 109 is horizontally disposed in correspondence with the mold clamping cylinder at each of four corners of the movable board 3. The end portion of each tie bar 109 has a thread shaft 124 which is connected to the thread of the chucks or half-nuts 122. In the center of the thread shaft 124, an insertion hole 125 for inserting the spline shaft 115 is provided.

A limit switch 126 is provided for checking the rear limit of the stopper 116. Reference numeral 127 denotes a rotary encoder. Reference numeral 128 denotes a fixed mold half. Reference numeral 129 denotes a movable mold half.

Reference numeral 130 denotes a differential circuit of the mold clamping cylinder 105. In the differential circuit 130, hydraulic paths 133 and 134 are connected from a front oil chamber 131 and a rear oil chamber 132 to a pump circuit 136 through a logic valve 135. The differential circuit 130 is provided with a logic valve 138 between the hydraulic path 134 on the rear oil chamber side and a drain circuit 137. The logic valve 135 is connected to a pilot circuit 140 having a selector valve 139 so that it is opened and closed according to a circuit pressure of the front oil chamber. On the other hand, the logic valve 138 is connected to pilot circuits 142 and 143 with a selector valve 141 so that it is opened and closed with a circuit pressure on the pump side and that on the drain side.

The clamping operation of the foregoing embodiment will now be described.

Figure 5:
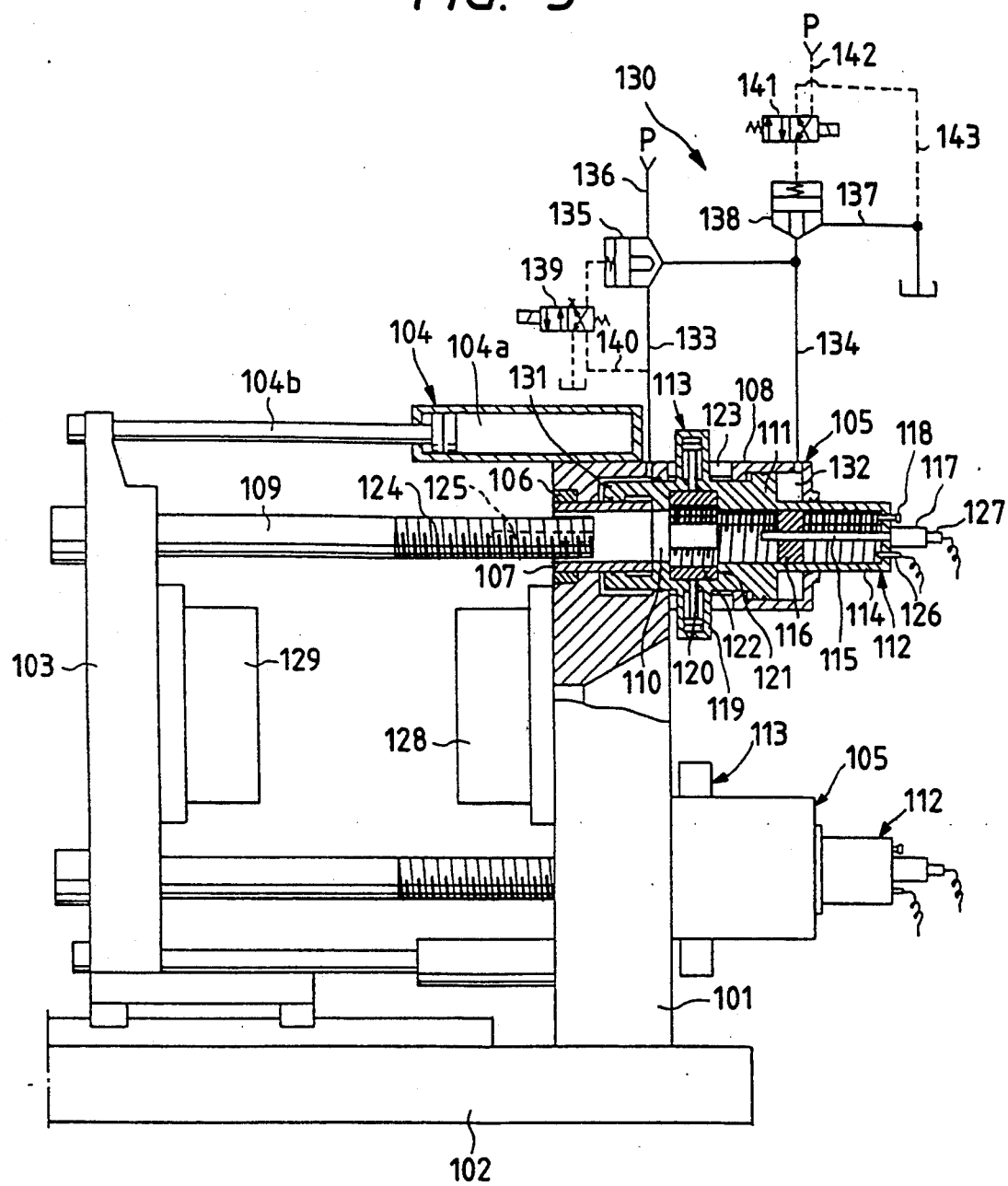
FIG. 5 is a vertical sectional side view of a clamping cylinder portion according to another embodiment of the invention.

In the mold open state shown in FIG. 5, the mold open/close cylinders 104 causes the movable board 103 to move to the fixed board 101 so as to close the mold halves at a high speed.

Figure 6:
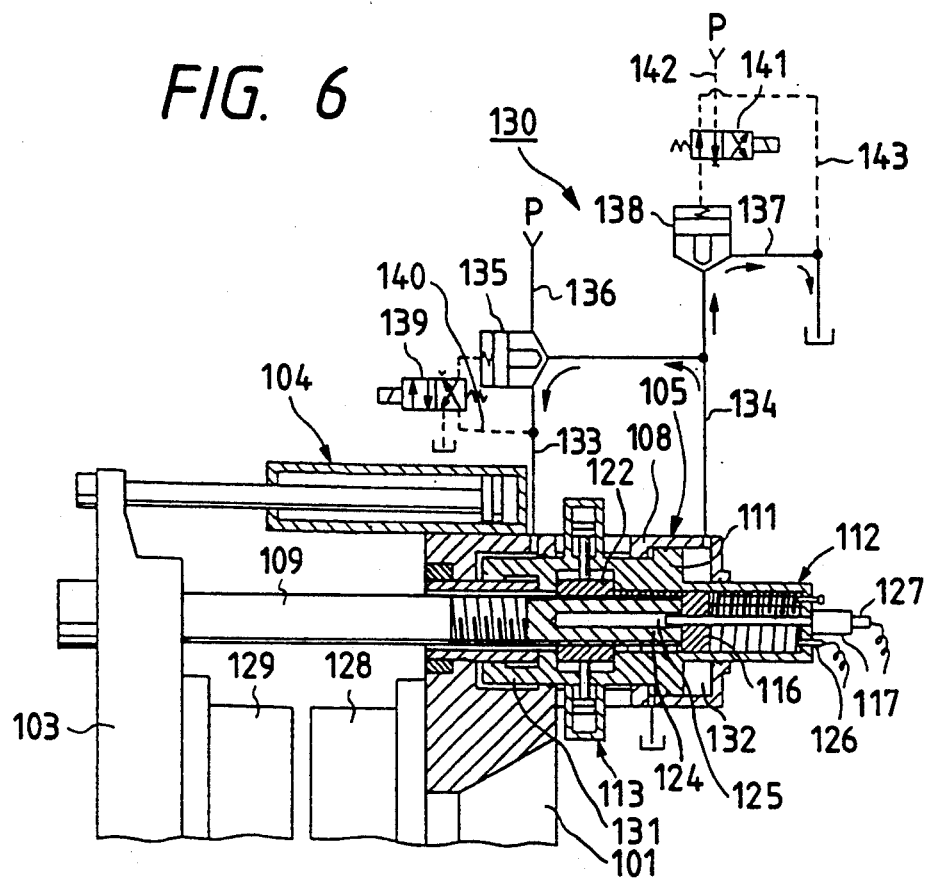
FIGS. 6 to 8 are vertical sectional side views of a mold clamping cylinder portion shown in FIG. 5.

As shown in FIG. 6, when the movable board 3 moves forwardly, the thread shaft 124 at the end of each tie bar 109 enters the inside of the mold clamping piston 111 from the sleeve 107. Before the mold halves are completely closed, the thread shaft 124 contacts the stopper 116 which has been aligned with the thickness of the mold halves.

When the selector valves 139 and 141 of the differential circuit 130 are set so that the logic valves 135 and 138 are opened in accordance with a hydraulic pressure of the hydraulic path 134, the hydraulic oil of the rear oil chamber 132 flows in the front oil chamber 131 as the mold clamping piston 111 moves. The excessive hydraulic oil which takes place due to the difference of the pressure affecting areas is drained to the tank.

Thus, while the mold clamping piston 111 drains the hydraulic oil of the rear oil chamber, it moves to the mold closing completion position together with the tie bar 109. Thus, the mold closing speed is changed from a high speed to a low speed. In addition, since the thread shaft 124 of the tie bar 109 contacts the stopper 116, it stationarily faces the pair of chucks 122 of the connection device 113. Thus, while the thread shaft 124 is moving, the hydraulic pressure is applied so as to chuck the end portion of the tie bar by the chucks 122.

Figure 7:
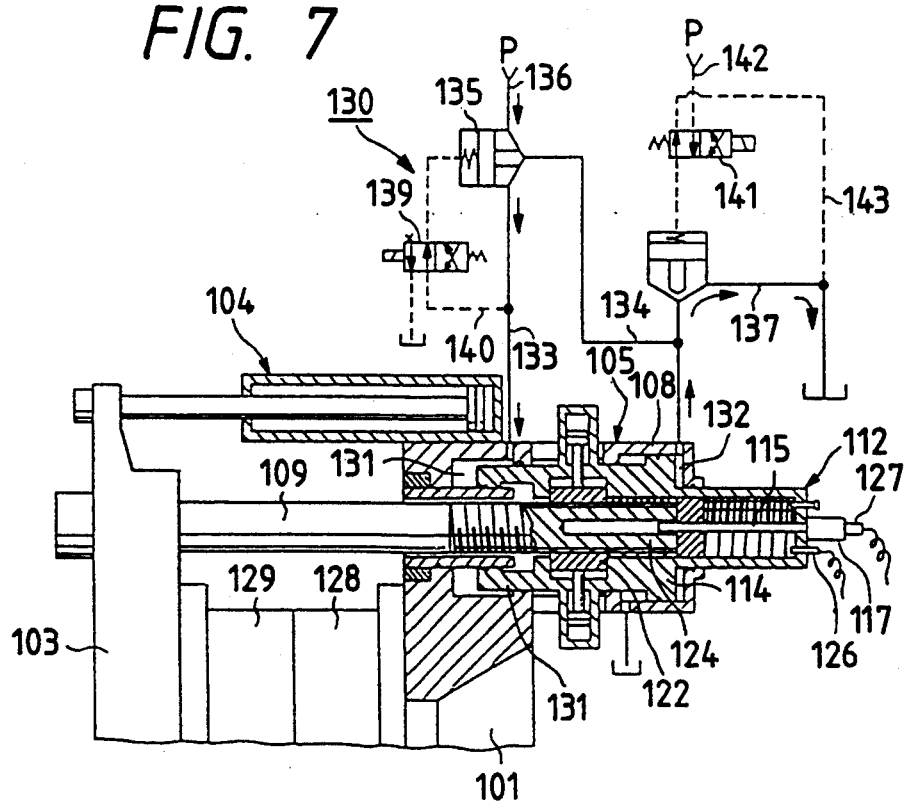

When the chucking operation is detected by a limit switch or the like and it is determined that the mold close operation has been completed, as shown in FIG. 7, the selector valve 139 of the differential circuit 130 is switched so that the logic valve 135 is closed with a circuit pressure on the front oil chamber side. Thus, the two chambers are closed. However, since the rear oil chamber is connected to the tank, the hydraulic oil from the pump side circuit 136 is supplied only to the front oil chamber 131. In this state, the mold halves are clamped at a high pressure.

Figure 8:
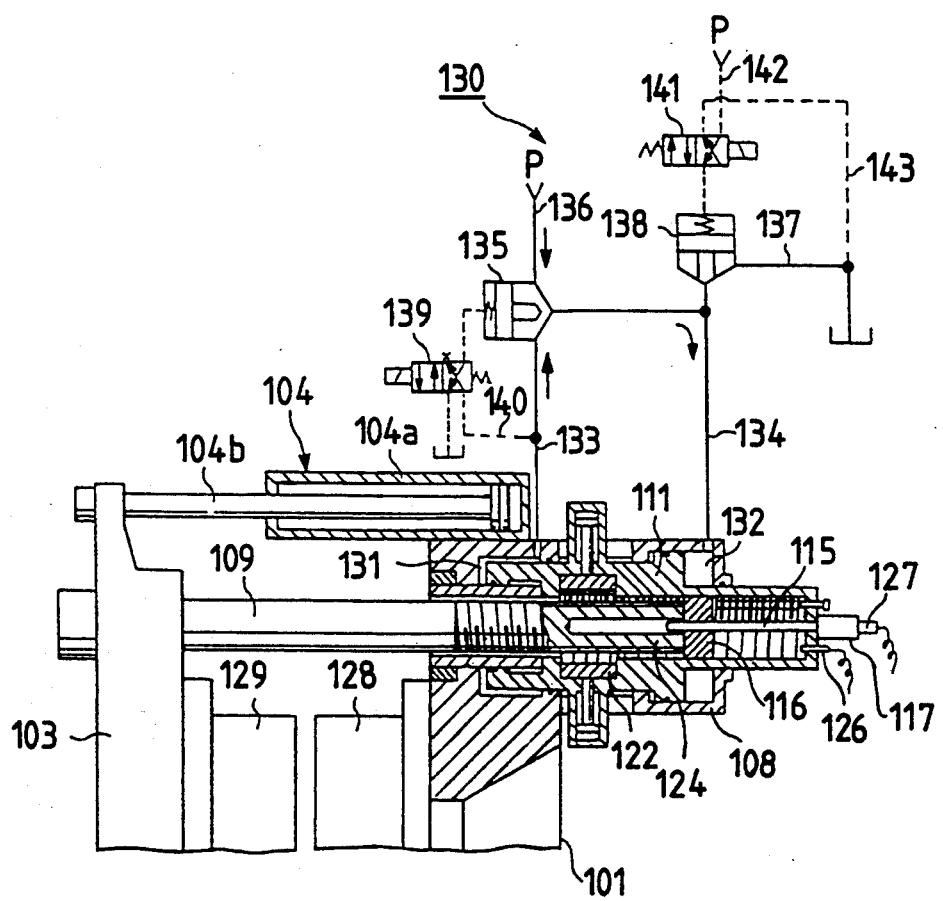
Figure 9:
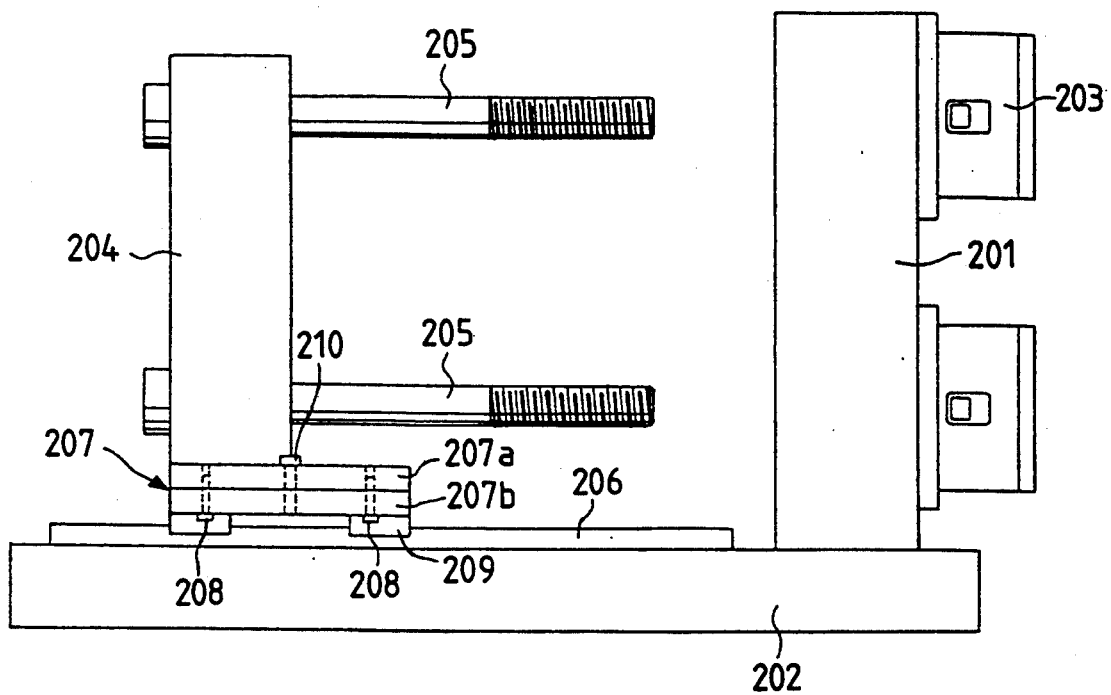
FIG. 9 is a side view showing the apparatus omitting mold opening/closing cylinders in accordance with another embodiment of the invention.
Figure 10:
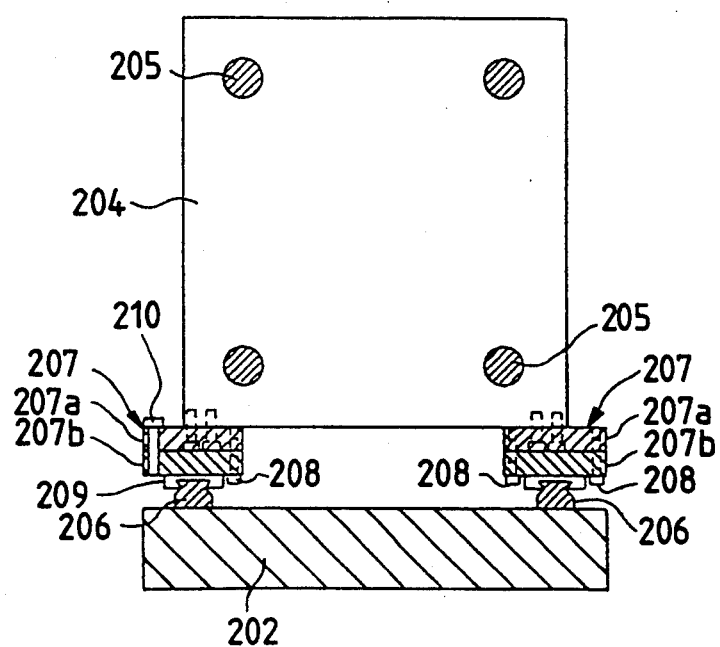
FIG. 10 is a vertical sectional view showing a slider portions.

As shown in FIG. 8, when the front oil chamber 131 is depressurized, the end portion of the tie bar 109 is dechucked and then the selector valves 139 and 141 are switched so that the logic valve 135 is opened and the logic valve 138 is closed. Thus, both the chambers are connected and hydraulic oil is supplied from the pump side circuit 136 thereto. However, since the pressure affecting area of the rear oil chamber is larger than that of the front oil chamber, a pressure difference takes place. Thus, the hydraulic oil is supplied to the rear oil chamber, while the hydraulic oil in the front oil chamber is extruded to the rear oil chamber by the mold clamping piston 111.

Consequently, the hydraulic resistance of the front oil chamber is gradually removed. In addition, the hydraulic oil is smoothly supplied to the rear oil chamber 132. Thereby, the mold halves are strongly opened. At that time, the strong clamping force is transferred to the movable board 103 through the stopper 116. After the strong clamping process is completed, the supply of the hydraulic oil to the front oil chamber 131 and the rear oil chamber 132 is stopped. Instead, the hydraulic oil is supplied to the mold opening/closing cylinder 104 and thereby the mold halves are opened with the mold opening/closing cylinder 104. In addition, the selector valve 141 on the rear oil chamber side of the differential circuit 130 is switched so that the logic valve 138 is open.

It is also possible to construct the mold open circuit of the mold opening/closing cylinder 104 in the same manner as the above mentioned differential circuit so as to further improve the overall efficiency and reduce the cycle time.

As was described above, in the clamping apparatus of molding machine according to this embodiment, each mold clamping cylinder is provided with the mold clamping piston having the tie bar insertion hole and the tie bar connection device disposed on the mold clamping piston side, the front oil chamber and the rear oil chamber of the mold clamping cylinder being connected. Thus, when the mold clamping piston is moved except in the strong mold clamp state, the hydraulic oil drained from the oil chamber on the pressurized side is supplied to the oil chamber on the pressurizing side through the differential circuit. Thus, the amount of hydraulic oil supplied to the pressurizing side in the strong mold opening state is small, the amount being the volume difference between both the chambers. In addition, the hydraulic oil can be rapidly supplied and drained and thereby improving the pressure rise characteristic in comparison with the case where the hydraulic oil is supplied and drained independently for the individual chambers. Moreover, the hydraulic system with a low capacity can be used. Thus, the clamping apparatus of molding machine can be compactly and inexpensively constructed.

Another embodiment of the invention will now be described with reference to FIGS. 9 to 12. A fixed board 201 disposed on the upper surface of a machine base 202. The fixed board 201 has mold clamping cylinders 203 at the four corners thereof.

A movable board 4 is opposed to the fixed board 201. The movable board 204 has tie bars 205 each extending at the four corners thereof. Each tie bar 205 is engaged with the mold clamping piston in the mold clamping cylinder 203.

The movable board 204 is movably disposed in the forward and backward direction through sliders 207 on a pair of guide rails 206 which are disposed perpendicularly to the fixed board 201. Each slider 207 is composed of an upper plate 207a and a lower plate 207b which are rectangular and have the same size and which are slidably stacked.

On the upper and lower surfaces of both plates, holes for bolts 208 are provided in the same positions. In addition, the bolt holes of the lower plate are loose holes with a particular diameter. Thus, even if both the bolt holes deviate to some extent, both the plates can be connected with the bolts 208.

The center of the upper plate 207a of each slider 207 is placed on the mold mounting surface of the movable board 204. Each upper plate 207a of each slider is bolted on the lower surface of the movable board 204. Each lower plate 207b engages a guide member 209 disposed on the lower surface thereof with the upper surface of the guide rail so that it can freely move on the guide rail 206.

The upper plate 207a and the lower plate 207b are securely connected by the bolts 208. The movable board 204 is placed on the guide rails 206. In the center of one of the sliders 207, a pin 210 about which the both upper plates 207a rotate passes through the upper plate 207a and the lower plate 207b.

Figure 11:
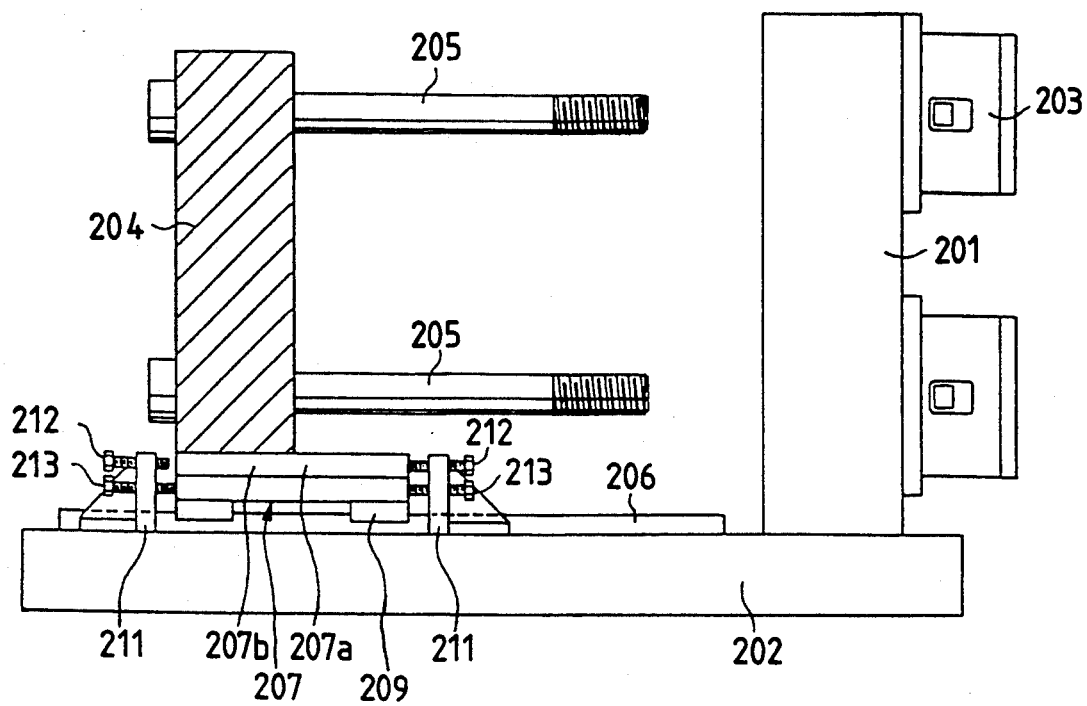
FIG. 11 is a partial vertical sectional view in the state where parallelism is adjusted.
Figure 12:
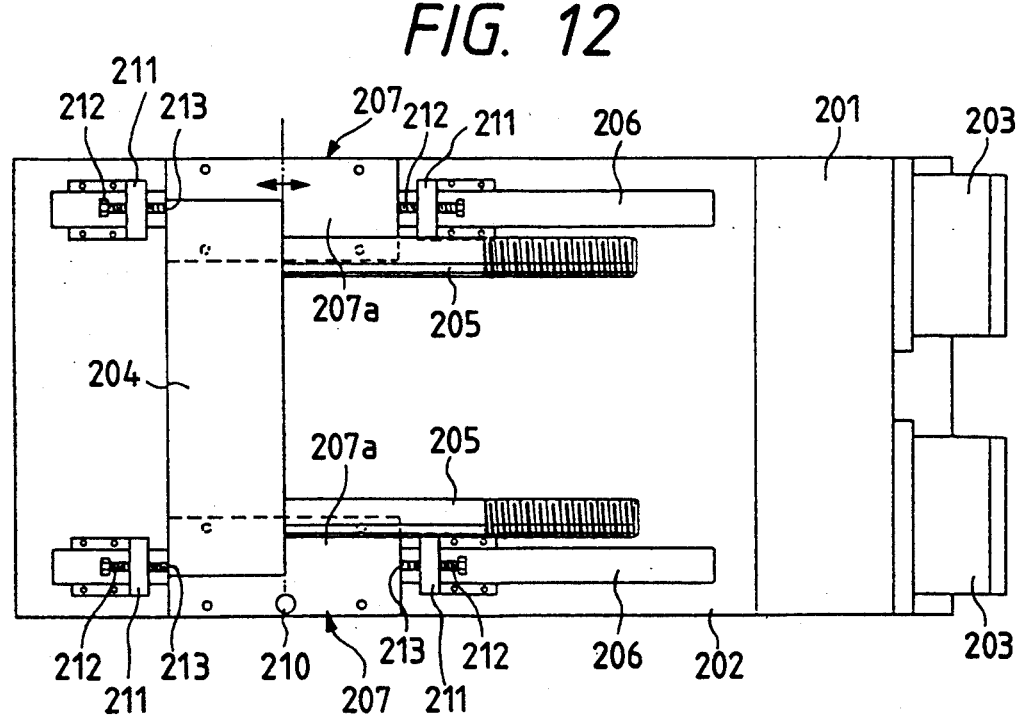
FIG. 12 is a plan view of FIG. 11.

When the parallelism of the movable board 204 is adjusted by the sliders 207, a jig as shown in FIGS. 11 and 12 is used.

Each jig is composed of an L shaped reception metal 211 straddled with each guide rail 206 and bolted on the upper surface of the machine base, a pair of upper and lower adjustment bolts 212 horizontally screwed to the reception metal 211, and a support bolt 123. The reception metals 211 are disposed in the front and rear positions of the sliders 207 and fixed on the machine base. Thereafter, both support bolts on the lower side are screwed so as to nip and fix the lower plate 207b from both the ends.

Thereafter, the bolts 208 for connecting both the plates are loosened so that both the upper plates 207a are movable to both the lower plates 207b. The upper plate of the slider which is provided with the pin 210 is kept at it is. The adjustment bolt 212 is screwed so that it contacts the front end of the upper plate 207a of the slider which is not provided with the pin 210. When the bolt 212 is further screwed, the upper plate 207a slides on the upper surface of the lower plate 207b with the pressure of the bolt 212 and rotates about the pin 210.

Thus, the movable board 204 fixed with the upper plates 207a and 207a is slightly and horizontally moved in a fan shape. Consequently, the angle of the mounting surface of the movable board 204 against the mold mounting surface of the fixed mold 1 varies and thereby the parallelism can be correctly adjusted.

After the parallelism is adjusted, the upper plate and the lower plate are connected by the bolts 208. Thereafter, the jig is removed so that the movable board 204 can move along the guide rails 206 with the sliders 207.

The upper plate 207a may be slid from the front position and the rear position by means of the adjustment bolt 212. The jig disposed on the slider 207 through which the pin 210 passes may not require the adjustment bolt.

As was described above, the clamping apparatus of molding machine according to this embodiment comprises the movable board 204, the fixed board 201 which is opposed thereto, the machine base, the pair of guide rails 206 disposed on the machine base, the sliders 207 disposed on the guide rails, the upper plate 207a on the movable board side, and the lower plate 207b on the guide rail, both plates being slidably stacked, at least four positions of the plates being fastened with detachable bolts, a pin about which both plates of one of the sliders rotates passing therethrough. Thus, the connection of both plates in the embodiment according to this embodiment is stronger than that in the prior art where both the plates are connected with a pin so that they can mutually deviate. In addition, the movable board which is frequently moved in the forward and backward directions does not cause both the plates to get loose. Thus, the parallelism of the movable board against the fixed board is always properly kept. Moreover, the parallelism is not lost by vibrations and shocks during the mold clamping operations.

Furthermore, only by sliding the upper plate of the slider which is not provided with the pin in the forward or backward direction, the parallelism can be adjusted. Thus, the adjustment according to the embodiment is easier than that of the prior art where a plurality of positions should be adjusted. In addition, both the plates are smoothly slid about the pin and thereby the parallelism for a very small amount can be readily adjusted.

Another embodiment of the invention will now be described with reference to FIGS. 13 to 20 in which a fixed board 301 is fixed to a base 302. A movable board 303 is disposed on the base 302 and movable relative to the fixed board 301.

Reference numeral 304 denotes a mold opening/closing cylinder. A cylinder 304a is fixed to the fixed board 301. A rod 304b is fixed to the movable board 303.

Figure 14:
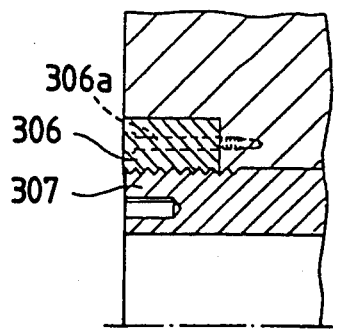
FIG. 14 is a sectional view showing the sleeve portion, showing in FIG. 13, for adjusting engagement position.

A mold clamping cylinder 305 is integrally formed at four corner of the outside of the fixed board 301. In an opening in the fixed board side of the mold clamping cylinder 304, as shown in FIG. 14, a sleeve 307 functions as a tie bar insertion hole connected with a thread ring 306 for adjusting an engagement position at the outer periphery of the inner end thereof. The thread ring 306 with a bolt 306a at the opening fringe, the sleeve 307 being rotatably and movably inserted in the mold clamping cylinder 305.

The mold clamping cylinder 305 is composed of a cylinder 308 unified with the fixed board 301; a mold clamping piston 311 having a hole 310 for receiving a tie bar 309 on the movable board side together with the sleeve 307 in the axial direction, the reception hole 310 having a reception wall 307a for receiving the end of the sleeve 307; a mold thickness adjustment device 312 disposed at the rear end of the mold clamping piston; and a connection device 313, disposed at a side portion of the clamping piston 311, for connecting the tie bar 309.

The mold thickness adjustment device 312 is composed of a thread pipe 314 whose one end is closed and which is disposed at the rear end of the mold clamping piston 311; a stopper 316 which is connected to a thread on the inner wall of the thread pipe 314 and which is engaged with a spline shaft 315 extended from the outer end of the thread pipe 314, the stopper 316 being forwardly and movable back and forth to the reception hole 310; a servo motor 317, disposed at the outer end, for rotating the spline shaft 315; and an adjustment bolt 318 of the stopper 316.

The connection device 313 is composed of a cylinder 319 integrally formed on both sides of the mold clamping piston 311; and a chuck 322 in a half-nut shape which is connected to the end of a piston rod 320, which is housed in an annular portion 321 inside the tie bar reception hole 310, and which is faced with the reception hole 310. The cylinder 319 is moved together with the mold clamping piston 311 by means of a long hole 323 disposed on the cylinder 308 on the mold clamping cylinder side.

The tie bars 309 are horizontally disposed in accordance with the mold clamping cylinders 305 at the four corners on the movable board 303. The end portion of each tie bar 309 has a thread shaft 324 which is connected to the thread of the chuck 322.

The threads of the thread shaft 324, the chuck 322, and the thread pipe 314 have the same pitches.

Reference numeral 325 denotes an insertion hole of the spline shaft 315 disposed in the center of the thread shaft 324. Reference numeral 326 denotes a limit switch for checking a rear limit of the stopper 316. Reference numeral 327 denotes a rotary encoder. Reference numeral 328 denotes a fixed mold half. Reference numeral 329 denotes a moving mold half.

In the above mentioned embodiment, on the fixed board side, the mold clamping cylinders are disposed. The tie bars 309 are disposed on the movable board side. However, when necessary, it is possible to dispose the mold clamping cylinders 305 and the tie bars 309 on the movable board side and the fixed board side, respectively.

Then, with reference to FIGS. 17 to 20, the adjustment of the mold thickness will be described.

The thread of the thread pipe 314 has eight pitches which are the same as those of other thread portions.

In the clamping apparatus, the original position of the stopper 318 has been set. With reference to the original position, the position of the stopper 316 to the tie bar 309 is adjusted.

Figure 17:
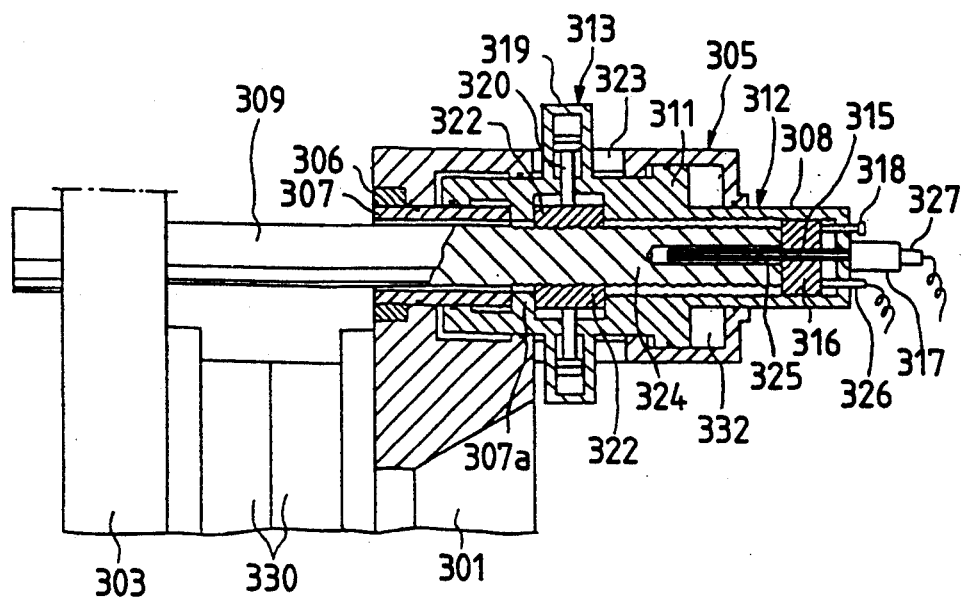
FIG. 17 is a partial sectional view showing original position setting of a stopper.

As shown in FIG. 17, the original position is set by mounting mold halves 330 with a smallest thickness on the fixed board 301 and the movable board 303. After the mold halves are closed, a small amount of deviation of the engagement position between the chuck 322 and the thread shaft 304 is adjusted. This adjustment can readily be performed by inwardly screwing the sleeve 307 so as to move the chuck 322 together with the mold clamping piston 311.

Thereafter, the spline shaft 315 is rotated by the motor 317 and thereby the stopper 316 is moved and contacted with the end surface of the thread shaft. After the motor 317 is stopped, the bolt is screwed and contacted with the stopper 316. The position where the bolt 318 contacts the stopper 316 is referred to as the original position of the stopper 316. In addition, an proximity switch 326 for checking the backward limit is set so that it works at this original position.

Figure 18:
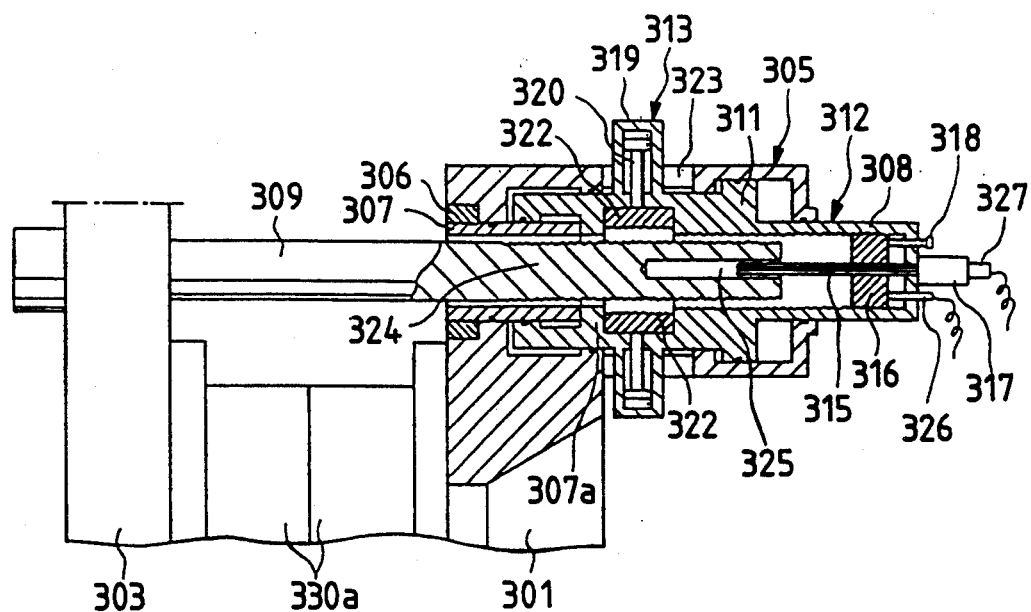
FIGS. 18 to 20 are partial sectional views showing adjustment between engagement position and stopper position involved in mold replacement.

As shown in FIG. 18, the mold thickness involved in the replacement of the mold halves is adjusted after new mold halves 330a are mounted.

Figure 19:
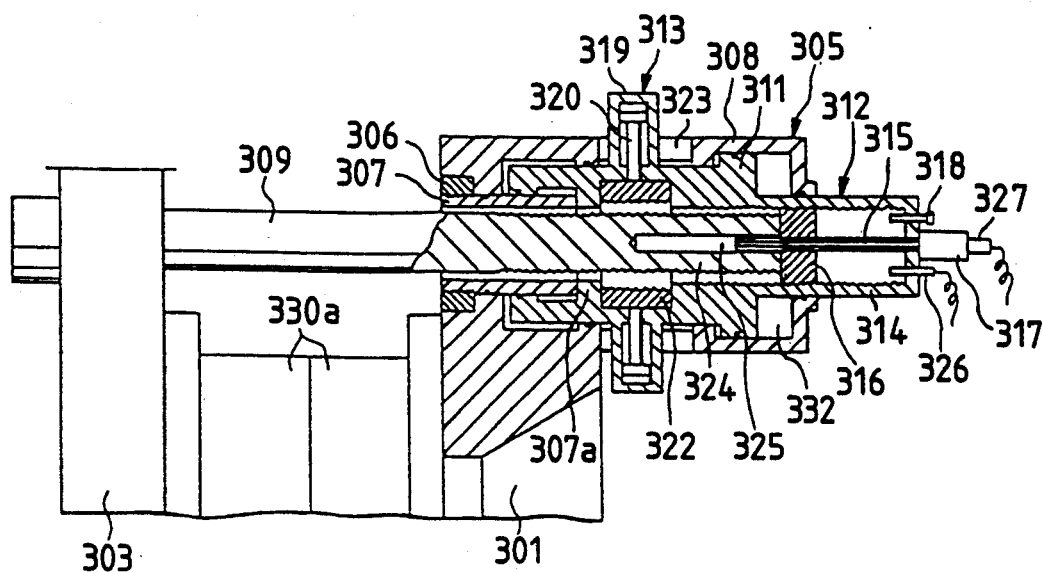

After the mold halves are closed, the thread shaft 324 of each tie bar 309 is inserted into each mold clamping piston 311. Thereafter, the stopper 316 which is lowered in the original position is moved by the motor 317 and then contacted against the end face of the thread shaft as shown in FIG. 19.

Figure 20:
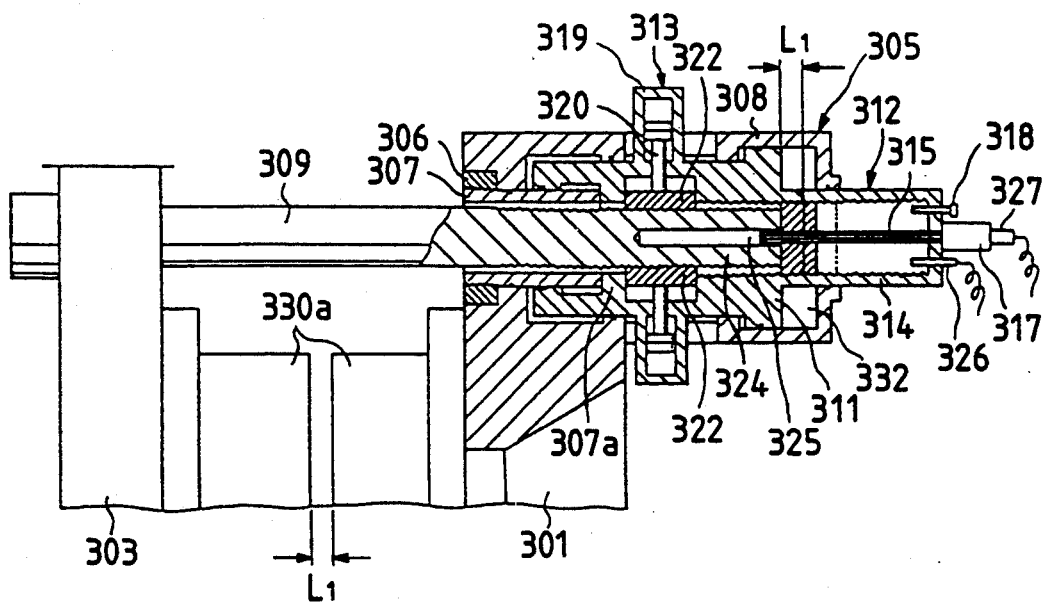

Thereafter, as shown in FIG. 20, the mold halves 330a are opened for a required length L1 so as to set the slow down distance of the mold clamping speed. When the mold halves are opened, each tie bar 309 is also moved in the backward direction. Thus, the end surface of each thread shaft is separated apart from the stopper 316 for the length L1. The length L1 is referred to as the slow down distance.

After the engagement position is adjusted by the sleeve 307, the stopper 316 is moved by the motor 317 and then contacted against the end surface of the thread shaft. Thus, before the mold halves are closed, each tie bar 309 is held by each mold clamping piston 311 through the stopper 316. Thereby, each tie bar 309 is moved together with each mold clamping piston 311 until the mold halves are closed.

When the end face of the thread shaft 324 of tie bar 309 is contacted with the stopper 316, the engagement position has been adjusted. Thus, in the slow down state, by moving the chuck 322 in the forward direction, it can be connected to the thread shaft 324. Thus, after the mold halves are closed, the strong mold clamping operation can be immediately performed.

Figure 13:
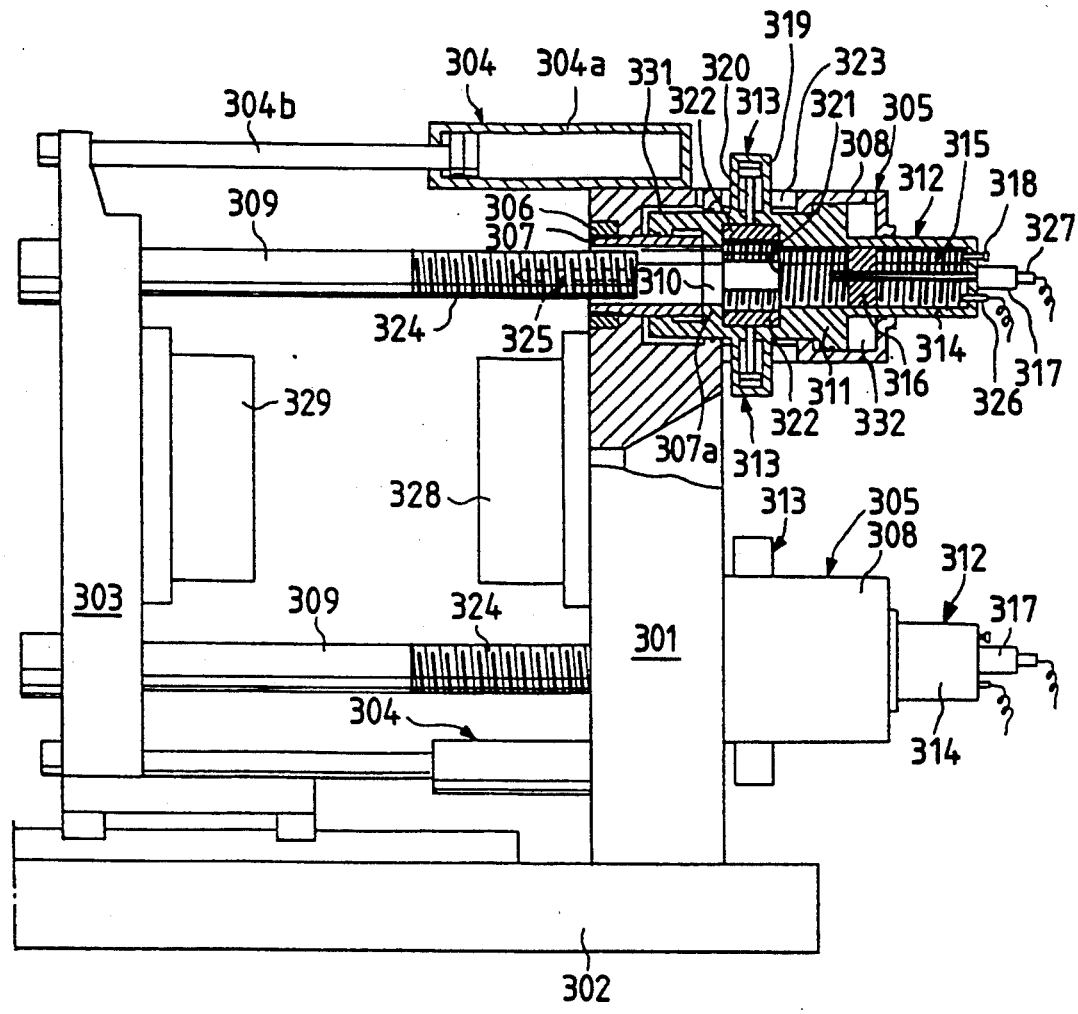
FIG. 13 is a vertical sectional side view showing a mold clamping cylinder portion according to still another embodiment of the invention.
Figure 15:
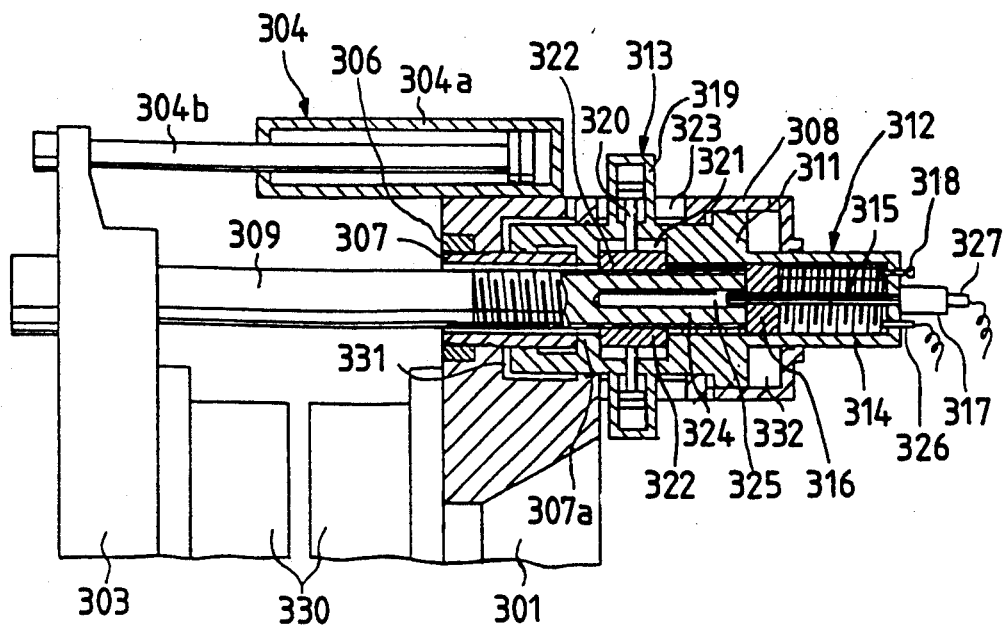
FIG. 15 is a partial sectional view showing the state just before mold halves are closed.

In the clamping apparatus where the mold thickness has been adjusted as was described above, when the mold opening/closing cylinder 304 is hydraulically operated in the mold open state shown in FIG. 13, the movable board 303 is moved to the fixed board 301 at a high speed and thereby closing the mold halves. As shown in FIG. 15, when the movable board 303 is moved in the forward direction, the thread shaft 324 at the end of each tie bar 309 is moved into each mold clamping piston 311 through the sleeve 307. Before the mold halves are completely closed, the thread shaft 324 is contacted with the stopper 316 which has been aligned in accordance with the thickness of the mold halves and then held by the mold clamping piston 311. Thus, each mold clamping piston 311 drains the hydraulic oil in the rear oil chamber and moves to the mold close completion position along with each tie bar 309. Thereby, the mold close speed slows down.

Since the thread shaft 324 of each tie bar 309 is contacted with the stopper 316, the thread shaft 324 stationarily faces the pair of chucks 322 of each connection device 313. After the mold close speed slows down, when each cylinder 319 is hydraulically operated, the chucks 322 are extruded and engaged with the side surface of the thread shaft of each tie bar 309.

Figure 16:
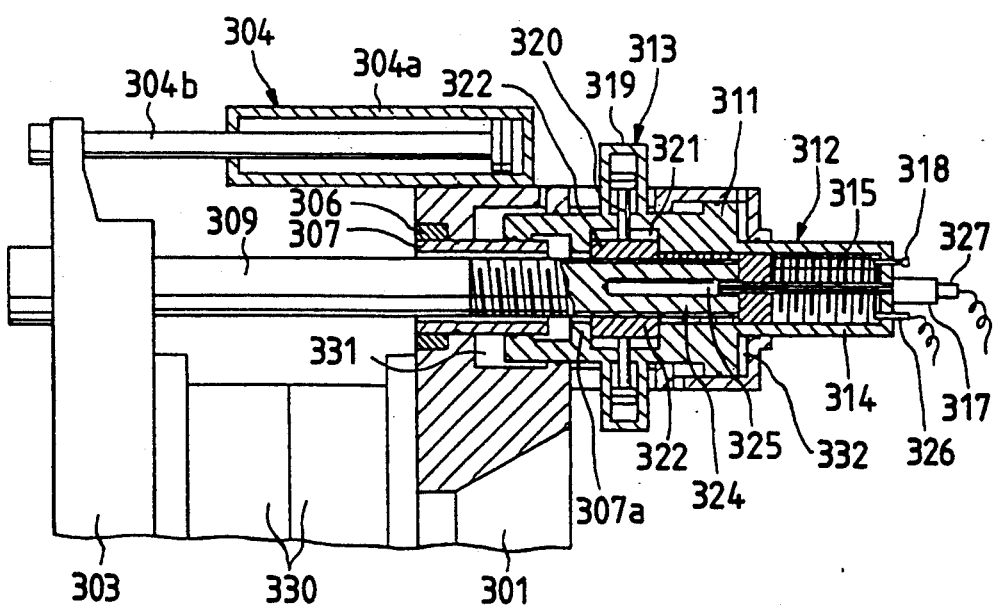
FIG. 16 is a partial sectional view showing the state where mold halves are clamped at high pressure.

This engagement is detected by a limit switch or the like. When the mold close completion state is detected, the hydraulic oil is supplied to the front oil chamber 331 as shown in FIG. 16 and then the mold halves are closed with a high pressure.

After the mold operation is completed, the hydraulic oil is supplied to the rear oil chamber 332. The hydraulic oil in the front oil chamber 331 is drained by the mold clamping piston 311 and then the strong mold open operation is performed. Thereafter, the engagement is released and the mold halves are opened by the mold opening/closing cylinder 304.

As was described above, with the sleeve 307 connected in the opening on the fixing board side of the mold clamping cylinder 305 and movable in the mold clamping piston 311 in the axial direction and the reception wall 307a disposed at the end of the sleeve formed in the reception hole 310 of the mold clamping piston 311, the chuck 322 is moved to the thread shaft 324 along with the mold clamping piston 311 so as to adjust the engagement position of the thread. Thus, the engagement position can readily be set when the mold halves are replaced. In addition, by slightly moving the sleeve, a small amount of deviation of the engagement position can be corrected and thereby preventing a damage of the thread due to an engagement failure.

Moreover, with the mold thickness adjustment device 312 comprising the stopper 316 of the tie bar 309 movably screwed in the thread pipe disposed at the rear end of the mold clamping piston 311 and the motor 317 for moving back and forth the stopper 316, while the tie bar 309 is being moved, it is engaged with the mold clamping piston 311 so as to set the slow down distance. Thus, the processes from the high speed mold close process to the strong mold clamping process can be continuously executed.

In addition, with the adjustment bolt 318 of the stopper 316 disposed at the outer end of the thread pipe 314 of the mold thickness adjustment device 312, the original position of the stopper 316 can be set. Thus, with reference to the original position, the movement amount of the stopper 316 by a servo motor or the like can be controlled.

A still another embodiment will be described with reference to FIGS. 21 to 23. Reference numeral 401 is a fixed board disposed on the upper surface of a machine base 402. Mold clamping cylinders 403 are disposed at four corners of the fixed board 401.

Reference numeral 404 denotes a movable board disposed on the fixed board 401. Tie bars 405 extend from the four corners of the movable board 404. Each tie bar 405 is threadedly engaged with an associated mold clamping piston provided within a mold clamping cylinder 403.

The movable board 404 is movable back and forth through sliders 407 while being guided by a pair of guide rails 406 which are provided on the upper surface of the machine base 402 and which extend in a perpendicular direction with respect to the fixed board 401.

A safety door 48 is horizontally slidable. The safety door 408 is mounted on a frame 408a which is disposed around the fixed board 401 and the rear side of the movable board 404. Mold halves 409 are mounted on the opposed surfaces of the fixed board 401 and the movable board 404.

A safety apparatus 410 is composed of a safety rod 411, an engagement device 412 disposed on the movable board side, and a bearing portion 413 disposed on the machine base 402.

The safety rod 411 is shaped as like a long shaft so that predetermined numbers of engagement stage portions 414 are provided on the outer periphery of the safety rod 411 at predetermined intervals. The engagement stage portions 414 are formed by cutting the outer periphery of a shaft portion in a stepped shape. A thread shaft 415 is formed at the rear end of the safety rod 411.

The engagement device 412 comprises a stopper member 416 in a block having a through hole, the block being fixed to a lower portion of the movable board 404, the stopper member 416 being movable vertically. The stopper member 416 is connected to a piston 418 of an air cylinder 417. As best shown in FIG. 21, the stopper member 416 has an insertion hole 419 for inserting the safety rod 411.

Figure 21:
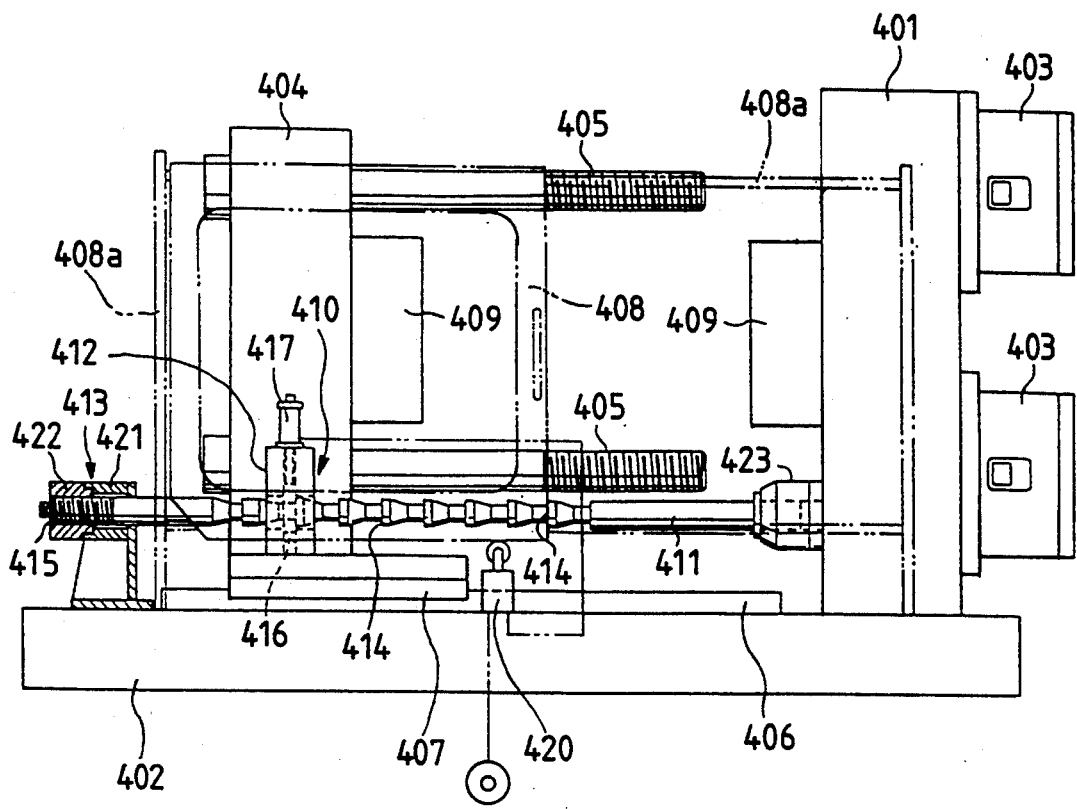
FIG. 21 is a side view showing another embodiment.
Figure 22:
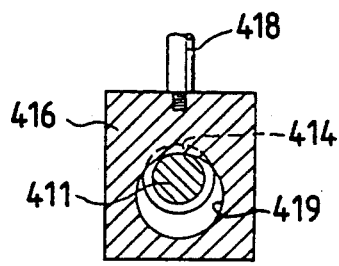
FIG. 22 is a vertical sectional view of a stopper member.

The air cylinder 417 is connected to a selector valve 420 on the machine base 402, the selector valve 420 being opened and closed by the safety door 408 as shown by the two-dot and dash lines in FIG. 21. When the safety door 408 is closed and the selection valve 420 is opened, air is supplied and the stopper member 417 is moved upwardly together with a piston 418 which is normally downwardly pressed by a spring. Thus, the engagement is released and thereby the movable board 404 can be moved forwardly.

The bearing portion 413 is composed of a support member 421 fixed on the machine base 402 and a nut 422 disposed in a predetermined position on the outside of the support member.

The end portion of the safety rod 411 is inserted into a reception member 423 at a lower position of the fixed board 401 from the bearing portion 413 through the stopper member 416 in the block. The thread shaft 415 at the rear end is connected to the nut 422. Thus, the safety rod 411 is horizontally disposed between the fixed board 401 and a portion above the machine base 402 disposed behind the movable board 404.

In the safety apparatus 410, as the safety door 408 is opened or closed, the air cylinder 417 operates so that the stopper member 416 and the safety rod 411 are engaged or disengaged.

In addition, when the mold halves are to be interchanged, the mold opening position is changed. In the case where the change cause an engagement position between the engagement stage portion 414 and the stopper 416 to be offset from each other, by rotating the safety rod 411 in the position of the nut 422 with a suitable tool such as a spanner together with the thread shaft 415, the safety rod 411 is moved forwardly or backwardly so as to adjust the engagement position.

Figure 23:
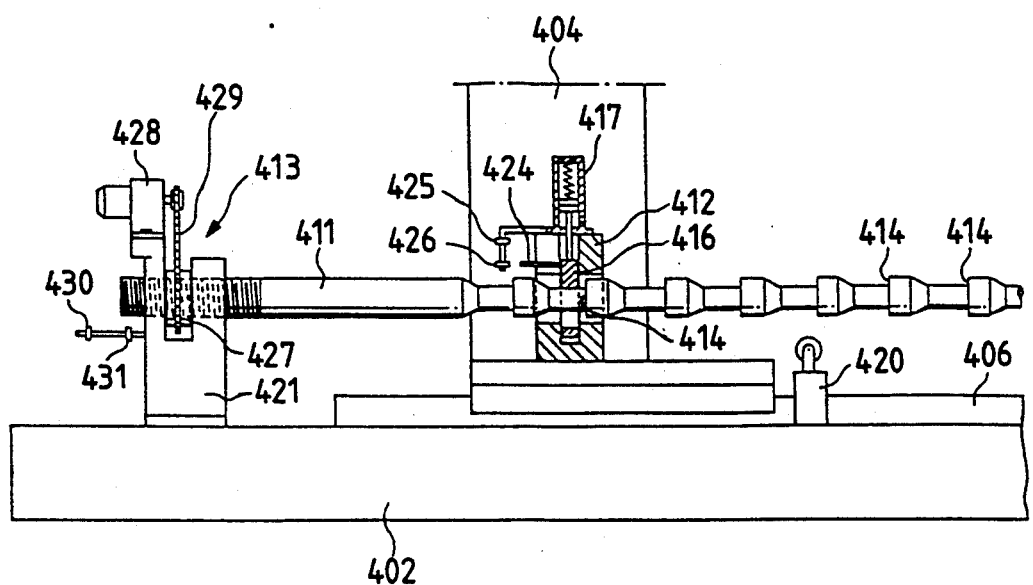
FIG. 23 is a partial sectional side view showing an engagement device according to a second embodiment.

In the example shown in FIG. 23, the engagement position is adjusted by a power means. The safety apparatus is provided with a pair of proximity switches 425 and 426 disposed on one side of the block of the engagement device 412, the proximity switches 425 and 426 being vertically opposed with a predetermined distance and operated by a detection rod 424 provided on a side portion of the stopper member 416.

The bearing portion 413 is composed of a rotation member 427 in a nut shape disposed at a predetermined position, the rotation member 427 being rotatably disposed in the support member 421; a motor 428 disposed at the top of the support member 421; a gear disposed on the outer periphery of the rotation member 427; and a chain 429 engaging a gear provided on an outer periphery of the rotation member 427 with a gear provided at the end of a driving shaft of the motor 428. In addition, on the outside of the support member 421 where the end portion of the thread shaft of the safety rod 411 is placed, a pair of proximity switches 430 and 431 for limiting the movement of the safety rod 411 are horizontally and outwardly disposed at a predetermined distance.

The end portion of the safety rod 411 is fittingly engaged with the reception member 423 on the fixed board side through a key or the like so that the guide rod 411 only moves in the axial direction of the safety rod 411.

In the safety apparatus, when the safety door 408 is opened or closed, the air cylinder 417 operates so that the stopper member 416 and the safety rod 411 are engaged or disengaged. The engagement and the disengagement are detected by the upper and lower proximity switches 425 and 426. While the safety door 408 is open and the proximity switch 426 does not detect that the stopper member is lowered, the motor 428 is automatically turned on.

Thus, the rotation member 427 is rotated through the chain 429 and then the safety rod 411 is forwardly and backwardly moved in the axial direction in the predetermined range of the proximity switches 420 and 431. This movement causes the stopper member 416 to be placed in the ring shaped groove of the stopper member 416. When the proximity switch 424 detects that the safety rod is lowered, the motor 428 is immediately turned off and then the engagement position is adjusted in a proper position.

Thus, even if the mold open position is changed due to interchange of the mold halves and thereby they are open, unless the proximity switch 426 detects that the stopper member 416 is lowered, the engagement position is adjusted automatically without an intervention of the operator.

As was described above, since these embodiments relate to a safety apparatus of clamping device wherein a fixed board and a movable board are opposed on a machine base, the movable board being movable back and forth along a pair of guide rails disposed on the machine base in parallel with each other, a safety door being disposed at a side portion of the safety apparatus, the improvement comprising an engagement device, disposed on the lower side of the movable board, for vertically moving a stopper member when the safety door is opened or closed, a safety rod being disposed between the fixed board and a bearing portion on the machine base located behind the movable board, the safety rod passing through the stopper member and having a particular number of engagement stages disposed at predetermined intervals, and a thread shaft formed at the rear end of the safety rod being connected with a nut of the bearing portion, the thread shaft being movable in the axial direction, unlike the prior art where the safety rod is extends from the movable board before the fixed board, the load of the safety rod is not applied to the movable board. In addition, the safety rod does not produce a deviated load. Thus, the parallelism of the movable board to the fixed board is maintained for a long time as it was set.

Moreover, even if the engagement position is changed due to the replacement of the mold halves, it can be safely adjusted by moving the safety rod in the axial direction on the machine base regardless of the thickness of the mold halves. Since the safety apparatus according to the present invention may further comprise a nut shaped rotation member disposed at the bearing portion on the machine base and rotated by a drive device, a thread shaft formed at the rear end of the safety rod and connected to the movable member, a pair of switches, disposed on an engagement device, for checking lift-up and lift-down of the stopper member, and a pair of switches, disposed at the rear end on the thread shaft side of the safety rod, for limiting the movement of the safety rod, wherein both the pairs of switches allow the drive device to adjust the engagement position automatically, the automatic adjustment of the engagement position can be performed by the drive device. In addition, it is not necessary to manually adjust the engagement position even if the thickness of the mold halves is changed. Thus, the safety apparatus according to the present invention is suitable for a large clamping device.

Still another embodiment in which the safety means is applied to another type of a clamping apparatus will now be described with reference to FIG. 24.

Figure 24:
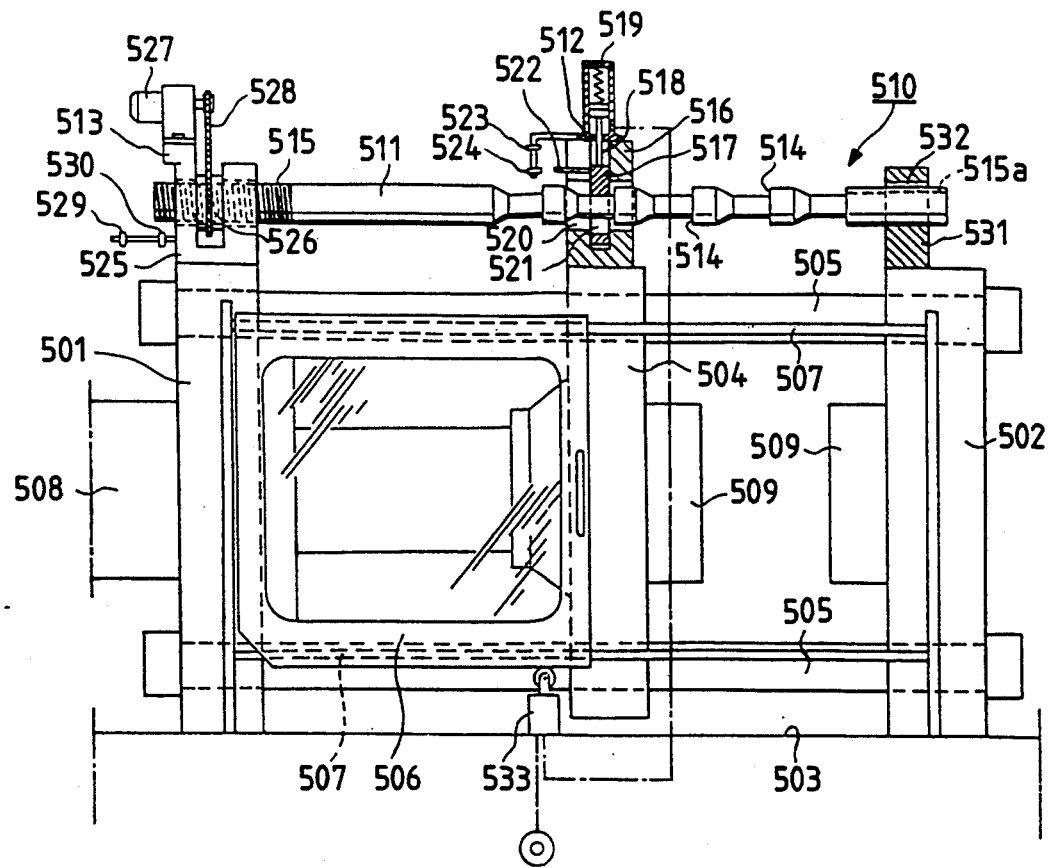
FIG. 24 is a vertical sectional side view a safety device according to another embodiment of the invention.

In FIG. 24, reference numerals 501 and 502 denotes a pair of fixed boards which are opposed each other and provided on a machine base 503. Reference numeral 504 denotes a movable board slidably disposed on tie bars 505 and 505 of the fixed boards 501 and 502.

Reference numeral 506 denotes a safety door which is horizontally slidable. The safety door 506 is disposed on a frame 507. The frame 507 is disposed between the fixed boards 501 and 502. The reference numeral 508 denotes a mold clamping cylinder disposed on the fixed board 501. The reference numeral 509 denotes mold halves which are separately mounted on the opposed surfaces of the fixed board 502 and the movable board 504.

Reference numeral 510 denotes a safety means which is comprised of a safety rod 511, an engagement device 512, and an automatic adjustment device 513. The safety means is the substantially the same as that of the foregoing embodiments.

In the safety apparatus 510, the safety rod 511 extends at the tops of the pair of the fixed boards 501 and 502. The safety rod 511 is mounted on a mold clamping device.

The safety rod 511 has such a length that both end portions of the rod 511 are supported by the pair of fixed boards 501 and 502, respectively.

The safety rod 511 includes a predetermined number of engagement stage portions 514 at predetermined intervals along a longitudinal axis of the rod 511. The safety rod 511 is shaped as like a shaft and the engagement stage portions 514 are formed such that portions of the shaft, which correspond to the intervals, respectively, are cut out.

The safety rod 511 further includes a guide groove portion 515a formed on the front end portion thereof for preventing a rotation of the rod 511 relative to the fixed board 502, and a threaded portion 515a formed on the rear end portion thereof.

The engagement device 512 is comprised of a block 516 fixed on the movable board 504; a stopper member 517 which is vertically movably provided in the block 516; and an air cylinder 519 which is disposed at the top of the block 516 and which contacts a piston 518 to the stopper member 516. The block 516 and the stopper member 517 have insertion holes 520 and 521 for inserting the safety rod 511, respectively.

The air cylinder 519 is connected to a selector valve 533 which is opened and closed by the safety door 506. When the safety door 506 is closed and thereby the selector valve 533 is opened, air is supplied and then the stopper member 516 is upwardly moved together with the piston 518 which is always pressed downwardly by a spring. Thus, the engagement is released and the movable board 504 can be forwardly moved.

On one side of the block 516, a pair of checking proximity switches 523 and 524 are vertically disposed with a predetermined distance. The proximity switches 523 and 524 are operated by a detection rod 522 disposed on one side of the stopper member 517.

In the same manner as the foregoing embodiments, the automatic adjustment device 513 is composed of a bearing member 525 fixed on the fixed board 501; a rotation member 516 in a nut shape rotatably disposed in a predetermined position of the bearing member; a motor 527 disposed at the top of the bearing member 525; and a chain 528 engaging a gear disposed at the outer periphery of the rotation member 526 with a gear disposed at the end of the drive shaft of the motor 527. On the outside of the bearing member 525 where the end portion of the thread shaft of the safety rod 511 is disposed, a pair of proximity switches 529 and 530 for limiting the movement of the safety rod 511 are horizontally disposed with a predetermined distance.

The safety rod 511 extends through the block 516 and the stopper member 517 from a bearing member 531 side, disposed on the fixed board 502, to the bearing member 516 side, of the fixed addition, the thread shaft 515 is threadedly engaged with the rotation member 526. Moreover, the guide groove 515a at the end of the safety rod 511 is connected to the bearing member 531 through a key 532 so that the safety rod 511 is moved in the axial direction.

In the safety apparatus 510, when the safety door 506 is opened or closed, the air cylinder 519 operates and thereby the stopper member 517 and the safety rod 511 are engaged or disengaged. The upper and lower proximity switches detect whether the stopper member 517 and the safety rod 511 are engaged or disengaged. If the proximity switch 521 does not detect the stopper member 517 is lowered while the safety door 506 is open, the motor 527 is automatically turned on.

Thus, the rotation member 526 rotates through the chain 528. The safety rod 511 is moved back and forth in the axial direction in the predetermined range of the proximity switches 529 and 530 on the bearing member side by the thread lead. When the stopper member 517 is placed in the ring shaped groove of the safety rod 511 and the proximity switch 524 detects that, the motor 527 is immediately turned off and then the engagement position is properly adjusted.

Thus, when the mold halves are replaced, the mold open position is changed. Even in the mold open state, when the proximity switch 524 of the engagement device 512 does not detect that the stopper member 517 is lowered, the engagement position is adjusted automatically without an intervention of the operator.

Figure 25:
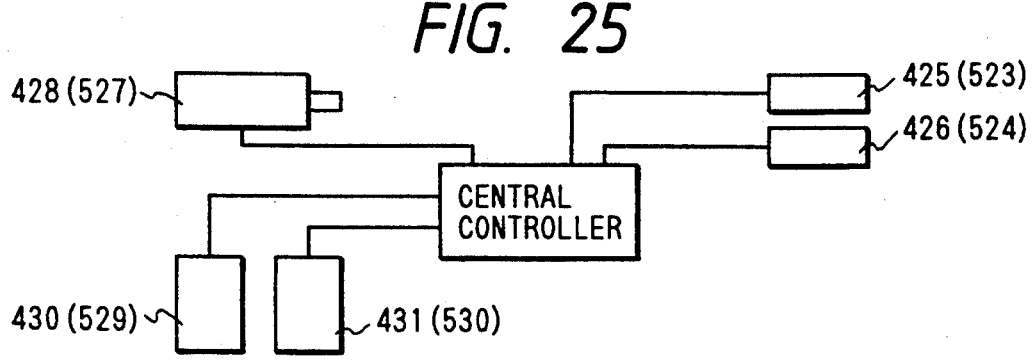
FIG. 25 is a block diagram showing an adjustment control system used in FIGS. 23 or 24.
Figure 26:
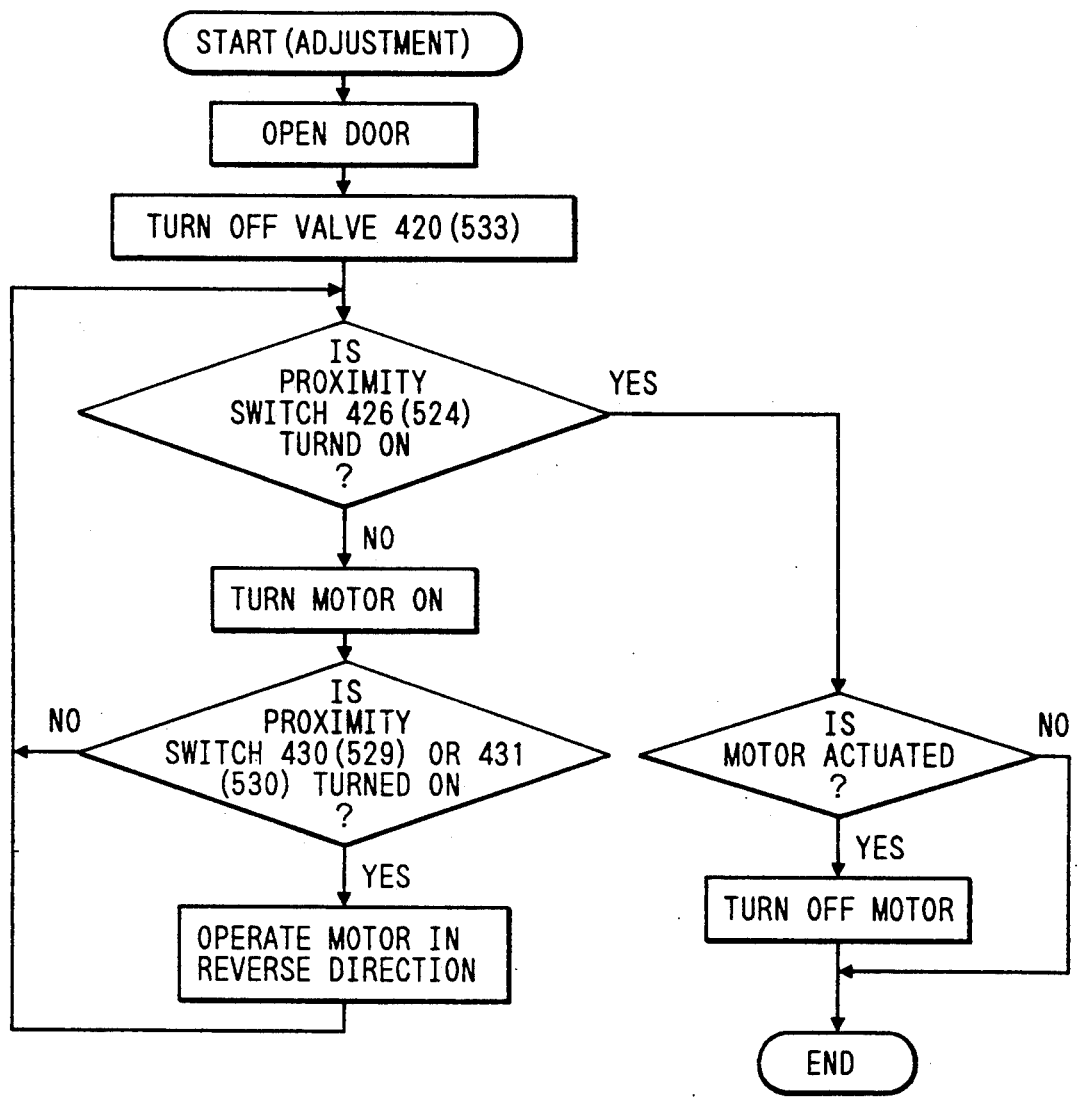
FIG. 26 is a flow chart for the system shown in FIG. 25.

FIG. 25 is a control diagram showing a control system for the motor 428 (527) in accordance the signals from proximity switches 425, 426, 431 and 430 (523, 524, 529 and 530). FIG. 26 is a flowchart therefor.

We claim:

1. A clamping apparatus for a molding machine, comprising:
   a fixed board disposed on a base;
   a movable board disposed on said base, said movable board being movable relative to said fixed board;
   a plurality of mold clamping cylinder devices each having a mold clamping piston with a tie bar insertion hole, said plurality of mold clamping cylinder devices being provided in predetermined positions of one of said fixed board and said movable board;
   a plurality of tie bard disposed on the other of said fixed board and said movable board, each insertable into a respective one of said insertion holes;
   a plurality of half nut connection devices respectively connected to said mold clamping pistons for clamping said tie bars to said one board;
   a mold opening/closing cylinder device for moving said movable board relative to said fixed board; and
   a mold thickness adjustment device disposed at an outer position of each of said connection devices for controlling the axial position of each of said tie bars with respect to each of said connection devices during said clamping, said mold thickness adjustment device having a stopper for containing an end of each of the bars, said stopper being movable in the axial direction thereof.

2. The clamping apparatus according to claim 1, further comprising guide rails secured to said base and sliders disposed between said movable board and said guide rails, each of said sliders being composed of an upper plate adjacent and fixed to said movable board and a lower plate slidably disposed on said guide rails, said upper and lower plates being slidably disposed with respect to one another and being connected to each other by at least four detachable bolts, one of said sliders having a pin pivotally attaching respective upper and lower plates to each other such that the angular position of said upper plates, and attendantly said movable board, can be adjusted with respect to said lower plates, and attendantly said guide rails.

3. The clamping apparatus of claim 1, wherein each of said mold thickness adjustment devices is fixed to a respective one of said half nut connection devices such that said mold thickness adjustment device and said connection device are movable together with a respective one of said clamping pistons.

4. The clamping apparatus of claim 1, wherein said mold thickness adjusting device includes a cylindrical casing having a threaded internal surface, said stopper being nut-shaped and having external threads that mate with the threaded internal surface of said casing and means for rotating said stopper.

5. The clamping apparatus of claim 4, wherein said rotating means includes a shaft fixed to a center of said stopper and a motor means for rotating said shaft.

* * * * *